US012430906B1

(12) United States Patent
Lim

(10) Patent No.: US 12,430,906 B1
(45) Date of Patent: Sep. 30, 2025

(54) LINKING DIFFERENT VARIATIONS OF MULTI-FEATURE AND MULTI-MODAL INFORMATION TO A UNIQUE OBJECT IN A DATASPACE, USING ATTENTION-BASESD FUSED EMBEDDINGS AND RDBMS, IDENTIFYING A UNIQUE ENTITY FROM PARTIAL OR INCOMPLETE IMAGE QUERY DATA, AND DISPLAYING LOCATION AND ACQUISITION TIME USING ARTIFICIAL INTELLIGENCE

(71) Applicant: Dong-Kwon Lim, Songkhla (TH)

(72) Inventor: Dong-Kwon Lim, Songkhla (TH)

( * ) Notice: Subject to any disclaimer, the term of this patent is extended or adjusted under 35 U.S.C. 154(b) by 0 days.

(21) Appl. No.: 18/616,635

(22) Filed: Mar. 26, 2024

(51) Int. Cl.
| | |
|---|---|
| *G06V 10/82* | (2022.01) |
| *G06V 10/141* | (2022.01) |
| *G06V 10/22* | (2022.01) |
| *G06V 10/80* | (2022.01) |
| *G06V 30/224* | (2022.01) |

(52) U.S. Cl.
CPC ............ *G06V 10/82* (2022.01); *G06V 10/141* (2022.01); *G06V 10/235* (2022.01); *G06V 10/803* (2022.01); *G06V 30/2247* (2022.01)

(58) Field of Classification Search
CPC .... G06V 10/82; G06V 10/141; G06V 10/803; G06V 30/2247; G06V 10/235
See application file for complete search history.

(56) References Cited

U.S. PATENT DOCUMENTS

| | | | |
|---|---|---|---|
| 9,135,277 B2 * | 9/2015 | Petrou | G06F 16/532 |
| 9,852,156 B2 * | 12/2017 | Petrou | H04W 4/02 |
| 2011/0128288 A1 * | 6/2011 | Petrou | G06V 10/235 |
| | | | 345/428 |
| 2018/0137542 A1 * | 5/2018 | Pesavento | G06Q 30/0276 |
| 2020/0097604 A1 * | 3/2020 | Lee | G06N 3/08 |
| 2022/0318296 A1 * | 10/2022 | Vang | G06F 16/5838 |
| 2024/0354332 A1 * | 10/2024 | Zeng | G06F 16/5846 |

* cited by examiner

*Primary Examiner* — Utpal D Shah
(74) *Attorney, Agent, or Firm* — Bay State IP, LLC

(57) ABSTRACT

The present disclosure describes methods, systems, apparatus, and media for object identification and classification, utilizing multi-feature and multi-modal data. This includes shape, material, brand, price, odor, taste, tactility, and sound. The system integrates a server space for data processing, a querying device for iterative searches, and a data interface module for refining results. It features AI-driven image optimization, feature extraction, and pattern recognition, employing novel techniques for fusing multi-feature and multi-modal embeddings utilizing multi-head attention. Additionally, a linker module powered by two active learning with feedback loops AI models consolidates scattered data into a unified object information database. The system also employs novel AI algorithms for isolating the object of interest through a saliency map and semantic analysis, as well as for enhancing raw images with a GAN-autoencoder.

4 Claims, 16 Drawing Sheets

LINKING DIFFERENT VARIATIONS OF MULTI-FEATURE AND MULTI-MODAL INFORMATION TO A UNIQUE OBJECT IN A DATASPACE, USING ATTENTION-BASESD FUSED EMBEDDINGS AND RDBMS, IDENTIFYING A UNIQUE ENTITY FROM PARTIAL OR INCOMPLETE IMAGE QUERY DATA, AND DISPLAYING LOCATION AND ACQUISITION TIME USING ARTIFICIAL INTELLIGENCE

TECHNICAL FIELD

The present disclosure pertains to the field of artificial intelligence (AI) and its utilization for the purpose of object classification utilizing multi-feature and multi-modal data and object identification utilizing visual similarity and context.

BACKGROUND

In the realm of search technology using computing devices, text-based or keyword searches are widely utilized, allowing users to input words or phrases into a search engine and receive a diverse array of results. However, when it comes to searching images, a significant limitation arises due to the challenge of describing an image using words. As a result, numerous techniques have been developed to discover similar images by converting the query image into a vector and comparing it to images within a vector space utilizing various machine learning techniques.

Nonetheless, a notable drawback exists in that the majority of image data available for comparison typically represent pristine and idealized snapshots of objects. This limitation poses a significant issue when the query image depicts a part of an object or has been captured from an unconventional lighting and/or skewed perspective. Consequently, a need arises to encompass and accommodate partial or distorted depictions of objects within the search process.

Another scenario that may arise involves the existence of duplicate object records pertaining to the same object or commercial product. In such cases, there is a clear necessity to establish links between images and unique object or product entities, addressing the challenges of duplicate data representation and retrieval.

Moreover, Conventional methods for identifying images typically focus only on the color values of the pixels, ignoring other aspects such as the identity, materials, brand, and price. This approach often yields a list of objects that merely share a similar color scheme, but lack meaningful resemblance. Additionally, to accurately identify objects that are challenging to differentiate based on appearance and text descriptions alone, such as chemicals, food, fabric, or birds, it is essential to also consider sensory characteristics like smell, taste, texture, and sound.

SUMMARY

The following presents a simplified overview of the information, intended to give the reader a basic understanding. This summary is not comprehensive and does not highlight essential elements or define the full scope of the details provided. Its main purpose is to introduce key concepts discussed herein in a simplified manner before presenting a more detailed description later.

The present invention relates to a system for identifying, categorizing, and searching objects utilizing query images and various modalities of data, which may be implemented on various platforms such as personal computing devices, robots, servers, or system-on-chip technologies. The object can be a product, a person, an event, an organism, a mineral, a tool, a scene or anything that can be captured by a camera, described in words or sensed by various sensors. The system includes a data input mechanism that collects various versions of images of the same object and multi-modal data to train an artificial intelligence model. This model may incorporate technologies such as expert systems, fuzzy logic, reactive machines, machine learning, artificial general intelligence, artificial superintelligence, and artificial intelligence models using quantum computers. The collected data, which can be annotated either by human administrators or automated processes, is stored in an object information database and associated with corresponding multi-modal data files in storage media.

The system operates by deriving object search criteria, which encompasses the analysis of partial, variously illuminated or skewed images, in combination with multi-modal data including but not limited to image, video frames, text, sound, odor, taste, and tactility data. Additionally, a novel process named attention-based fusion of embeddings is utilized so that the model can dynamically prioritize different attributes, namely the shape, material, brand, and price, leading to more accurate and relevant search results than simply searching for a similar look simply based on color pixels of the image. The system further incorporates accessibility and availability of the object from the inventory and supplier databases into the search criteria. This combination enables the system to identify and match objects or products similar to the query, returning a list of resulting objects or products with their availability, location, and pickup or shipping information.

In the case of the raw image having many different objects, the system can also enable user interaction for object selection through segmentation by an automated process or outline drawing by the user utilizing a pointer. This outline drawing can be a partial or full image of an object. In an automated process, the system identifies a specific Object of Interest (OOI) using an OOI prediction AI model. This AI model consists of a series of processes that involves creating a saliency map from the most sharply focused region or the shortest distance to the viewer, or the object with the highest price, as well as the identification of shape, material, and brand, followed by semantic identification of objects to rule out irrelevant items in the raw image. This process mimics the logical decision-making that a human might perform when identifying the object of interest from a complex view. The system can also eliminate background noise, background odor, and irrelevant tactility data.

In order to establish an AI model that can automatically enhance an image that are partially illuminated or skewed in representation, a novel approach named Generative Adversarial Network (GAN)-autoencoder AI model is introduced. In the GAN-autoencoder AI model, the autoencoder serves as the generator within the GAN, as opposed to conventional models where the generator is typically designed separately from the autoencoder. This unique integration allows the GAN-autoencoder to learn not only to reconstruct the input image but also to generate enhancements that correct issues related to partial illumination or skewed representation, resulting in improved image quality.

In addition to processing raw data provided by users for the purpose of querying, the system can incorporate this data into the existing object information database through the linker module, subject to authorization by human administrators or an automated process. The system enhances search accuracy by asking contextual questions about the provided data including and not limited to where the data is from, what the object is, who the object is for. The system further utilizes a comprehensive dictionary of synonyms, misspelled texts or voice descriptions, misused words to accommodate inaccuracies in the query input.

The system is capable of acquiring images of the object packaged in various packaging materials at different levels, images of the same object in plurality, and/or identifying alphanumeric values like UPC (Universal Product Code), SKU (Stock Keeping Unit), and PLU (Price Look-Up codes), as well as receipts or bills particularly for commercial products. These diverse data related to an object are correlated to unique object entity through a linker module, which merges various data entities to a single database entry from utilizing two active learning with feedback loops AI models which identifies any duplicate records of the object and merges them. This merging process can be subject to confirmation by either human administrators or automated systems.

The system is further equipped to analyze and categorize objects into different classification schemes based on a multitude of attributes such as type of object, sub-types of object, color, sub-colors, shape, sub-shapes, material, sub-materials, type of clothing, sub-types of clothing, and other specific characteristics like size, weight, species, breed, gender, age group, target population, fit, barcode, and sensory attributes like sound, smell, taste, and touch feel. The information gathered through the above process is stored as texts and numbers including a normalized scalar value of a one-dimensional vector of each attribute in a relational database management system (RDBMS) which gets employed along with vector spaces of different characteristics such as image, text, odor, taste, tactility, and sound. This technique is employed for the purpose of overcoming the rigid nature of vector-based data spaces which often need a complete reformation every time there is data to be added or deleted.

The invention also integrates an inventory database where suppliers or vendors can input data regarding object availability, pickup and delivery options, estimated time of arrival/delivery, costs, and online access URLs. The system utilizes this database to present a list of found objects, complete with access or acquisition information. Searches can be geographically constrained based on user preference, location or region, and the system can also leverage a user's identity, historical data, preferences, emotional states, brain waves, eye movements, blood pressure, heart beat rate, sensory data from organs, tone of voice, words used, behaviors, physical appearance, possessions, tools used, and instinctual responses for contextualized search and recommendations. Searches can also accommodate time of day, day of the week, day of the year, which day of holiday, weather, and economic indicators. Additionally, the system can give higher weights to objects and products having an intrinsically higher value from impartial assessment by the system, even if they are unpopular or offered by a minor provider.

Furthermore, the system is capable of generating an exhaustive list and detailed information about objects found in various video formats, including personal recordings, movies, TV shows, and Internet broadcasts, thus offering a comprehensive solution for object training, identification and categorization.

BRIEF DESCRIPTION OF THE DRAWINGS

The present invention is further described in the detailed description which follows, in reference to the noted plurality of drawings by way of non-limiting examples of exemplary embodiments of the present invention.

DETAILED DESCRIPTION OF THE EMBODIMENTS

The detailed description provide hereinafter in connection with the appended drawings is intended as a description of the present examples and is not intended to represent the only configurations in which the present disclosure may be constructed or utilized. The detailed description includes specific details for the purpose of providing a thorough understanding of various concepts. However, it will be apparent to those skilled in the art that the same or equivalent elements, functions and sequences may be accomplished by different examples.

Visual or textual search of any object is becoming important in various digital platforms, including personal computers at home, in the office, for gaming or educational use, as well as server environments such as data centers, cloud computing, virtual servers, edge servers, computing runtimes, and quantum computers. The application of visual and textual search can be extended to robotics in areas including industrial automation, service robots, and research and development. Mobile devices, embedded systems, wearable technology can also utilize object search functions using system-on-chip platforms.

Here, we describe a system, a method, and a medium that can perform better identification and classification of any object by incorporating a plurality of features and data modalities. These include image, text, shape, material, brand, price, odor, taste, tactility, and sound, as well as size, mass, density, and optical recognition, along with their semantic representation. A person skilled in the art will recognize that videos may also be included in the aforementioned features as frames of image and sound.

Additionally, the present invention also deals with situations where the information given by the user or inferred from the environment is incomplete or misleading. In such cases, the present invention utilizes partial or misleading data, context, and any additional data or corrections from subsequent iterations of requesting and receiving more information. This process continues until the system can accurately identify a unique object.

Figure 1:
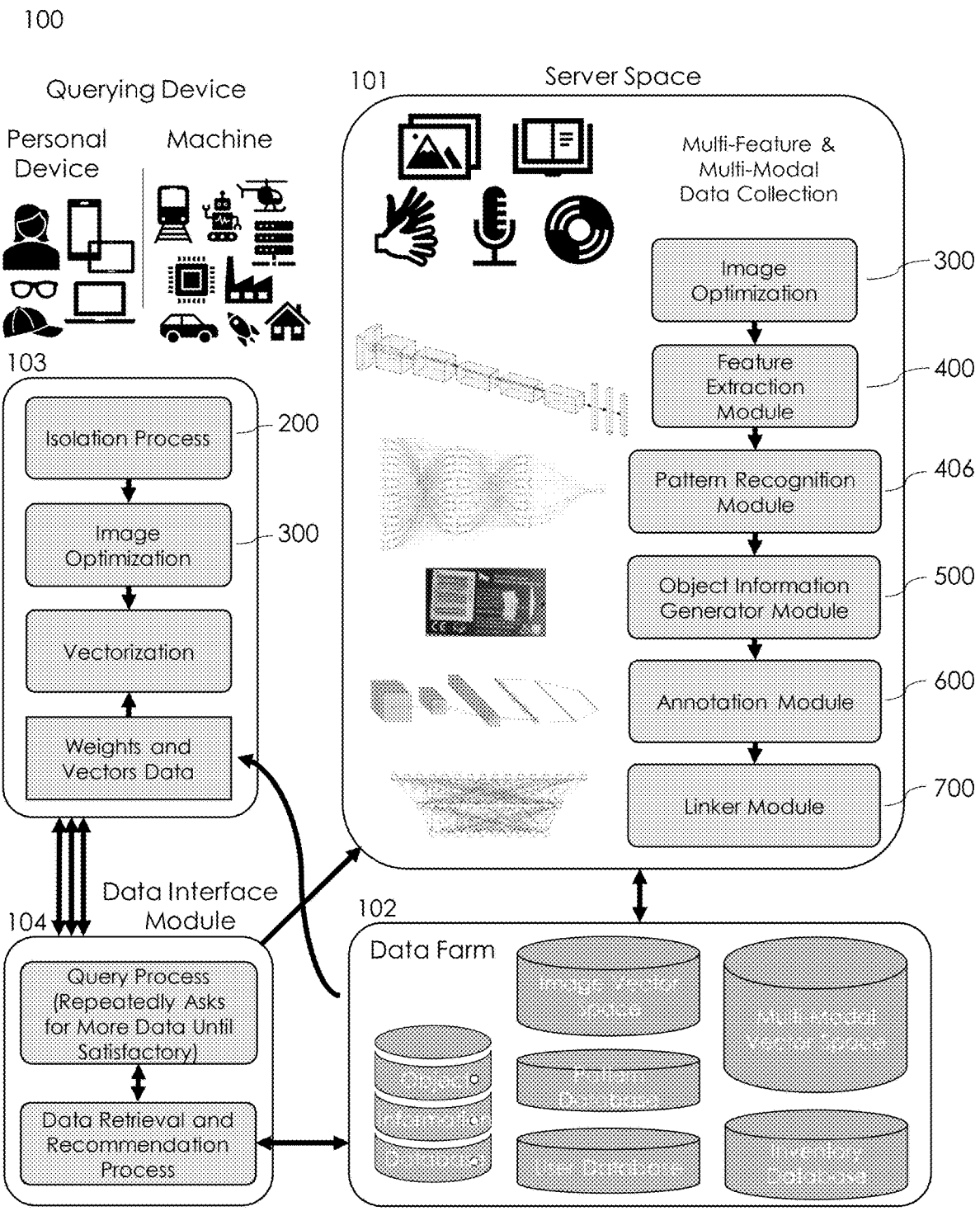
FIG. 1 illustrates the versatility of the system, showing its deployment in various computing environments such as personal devices, robots, servers, and system-on-chip platforms, as well as its overview of server and data configurations

Reference is first made to FIG. 1, which illustrates exemplary computing environments 100. These can include a querying device 103 that includes, but is not limited to, personal devices such as smartphones, tablets, computers, smart glasses or scopes, smart hats, smart wearable devices and cameras. This environment can also include servers, cloud computing spaces, edge computing devices, electronics, vehicles, satellites, houses, buildings, factories, warehouses, construction sites, farms, hospitals, airports, educational facilities, military equipment, signs and poles on streets, roads, tracks, waterways, containers, fixtures, gaming tools, as well as robotics for industrial automation, service robots, drones, and research and development equipment.

Exemplary computing environments 100 also include a server space 101 configured to collect multi-features and multi-modal data to associate various versions of data of different modality with a unique object. The server space 101 includes an image optimization process 300, feature extraction module 400, pattern recognition module 406, object information generator module 500, annotation module 600, and linker module 700. The server space 101 calculates weights and vectors through various artificial intelligence (AI) algorithms and interacts with data farm 102, which consists of various databases and vector spaces. Server space 101 provides data including weights, vectors, texts, images, videos, sound, odor, taste, tactility, etc., to enable search and identification of an object from the query image and text provided by the querying device 103. The text provided by the querying device 103 can include a textualized representation of multi-modal information such as odor, taste, tactility, and sound.

The data farm 102 can then be utilized to enable any querying device 103 to conduct a search in order to identify a unique object through the data interface module 104. The data interface module 104 comprises querying and data retrieval processes. The data interface module 104 utilizes the initial query image and text provided to search for similar objects from the data farm 102. If there is no object found with enough similarity in features from the data initially provided, the data interface module 104 requests the querying device to provide additional data, corrected data, data to be excluded, and the context. This context can be information that includes, but is not limited to, where the data is from, what the object is, and who the object is for.

The data interface module 104 can iterate, conducting a search with accumulated data and continuing to acquire more data and context, until a satisfactory result can be achieved. The data interface module 104 can further send all the information received from the querying device 103 to server space 101 for additional training of data and logging activities.

In instances where the querying device is a personal device, the data interface module 104 can integrate user and inventory databases from the data farm 102 as well as the device's location or region. This integration allows the module to prioritize the display order of identified objects, along with their acquisition or access details. Furthermore, when the querying device is utilized to search for similar objects or products akin to data provided, the data interface module 104 employs its recommendation process. It achieves this by assigning increased weight to the user's historical data and additional contextual factors. These factors include the time of day, day of the week, season, biological and physiological data of the user, current physical location, and economic indicators. Moreover, the module can also prioritize objects and products deemed to possess significant intrinsic value by the system's internal assessment despite of the items' low market performance or sales volume.

Furthermore, the weights and vectors stored in data farm 102 can be transmitted to the querying device 103, enabling the embedding process to be carried out without the substantial expense of transferring all raw data to server space 101. The data interface module 104 can also be integrated within the same device as the querying device 103, as well as being situated remotely. The example, wherein the data interface module 104 and the querying device 103 are incorporated together, reduces the need for extensive data bandwidth and conserves resources on the server side.

Upon the completion of comprehensive training for all AI models within the server space 101, the system can generate an exhaustive catalog alongside detailed information pertaining to objects discernible in a wide array of video formats. These formats encompass personal recordings, cinematic productions, television broadcasts, and internet-based transmissions. In doing so, the system will provide an all-encompassing solution for the purposes of object recognition, identification, and categorization within the context of video content.

Figure 2:
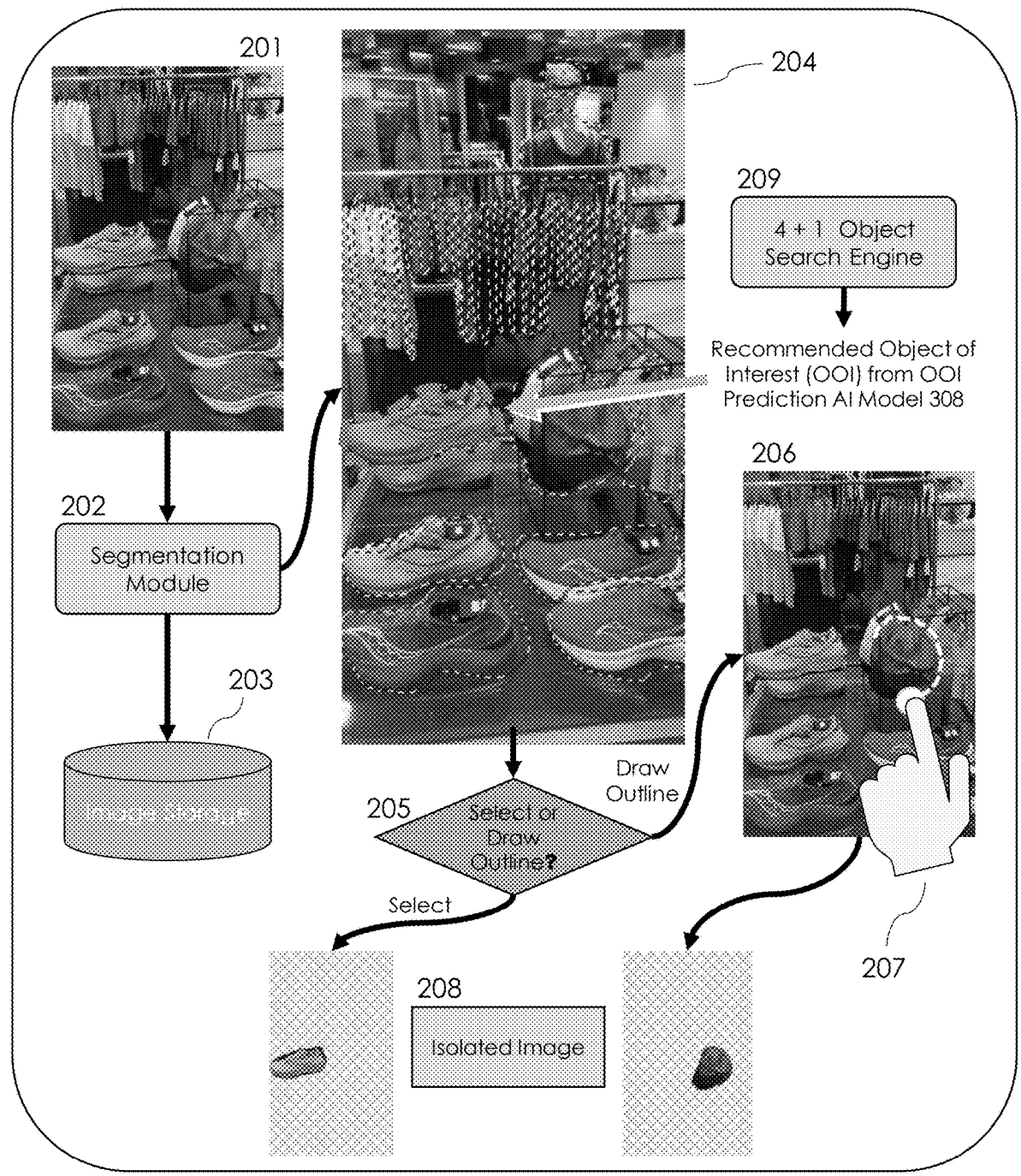
FIG. 2 depicts a user's input process, depicting the system's components to segment the raw image, to predict the object of interest, to select a single object, and to isolate the query object.

Referring to FIG. 2, an exemplary user interface 200 for isolating an Object of Interest (OOI) is illustrated, in accordance with implementation of the present disclosure. Raw data provided by a user or a machine at the query device 103 or an administrator at a terminal of server space 101 is processed by user interface 200 to isolate the image and/or data of various other modalities. As an example of image isolation, the raw image 201 is subjected to an object separation process via segmentation module 202, which saves the raw image 201 to image storage 203 for future training and employs diverse AI algorithms to enable the segmentation of objects within raw image 201.

Figure 13:
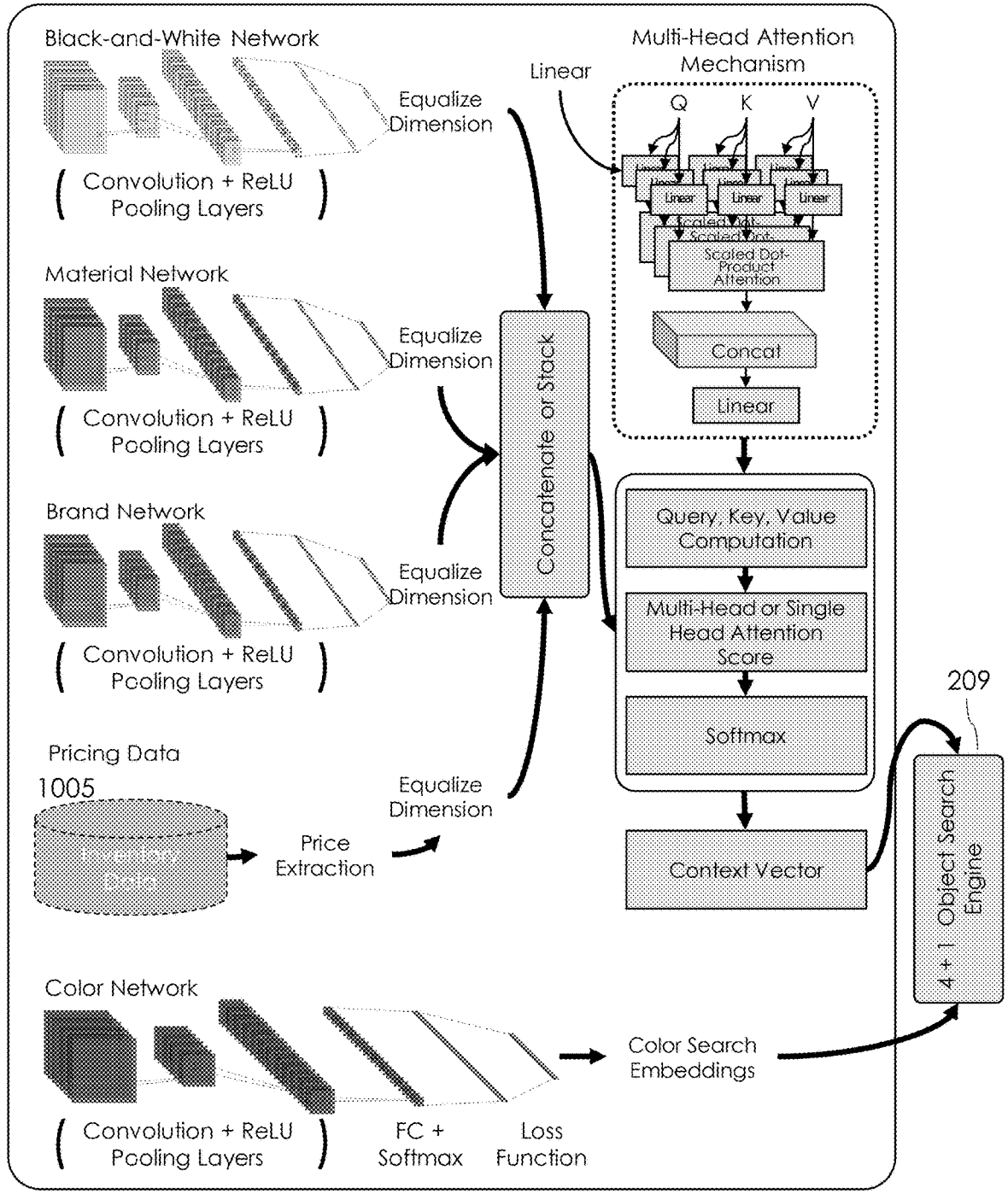
FIG. 13 illustrates the process and the structure of the multi-feature image vector space where different features are fused to produce attention-based fused embeddings.

The outcome of this process is segmented image 204, which exemplifies the automated segmentation achieved by segmentation module 202. In this image, each object is delineated using closed curves or bounding boxes, as per the system's configuration. The illustrated embodiment utilizes dotted closed curves, which can be selected either by the user or the administrator. The system utilizes a novel approach of identifying a salient Object of Interest (OOI) through a module referred as 4+1 object search engine 209 by employing pre-trained OOI prediction AI model 308 and multi-feature image vector space 403. The detailed descriptions and visual illustrations for the OOI prediction AI model 308 are presented in the sections explaining FIG. 11. Additionally, the comprehensive explanations and detailed illustrations for the 4+1 object search engine 209 are provided in the sections dedicated to FIG. 4 and FIG. 13.

At operation 205, the system presents the user or operator with the choice to select an object that is encased within closed curves, intended for utilization as an isolated query image. Moreover, the user or operator has an option to personally create an outline by employing a pointing device, which could be a cursor, a stylus pen, or even a finger. When the OOI is selected, the system removes any background, hanger, stand, frame, fixture, decoration, marketing texts, etc. to isolate the pure image of the object shown as the isolated image 208. The isolated image 208 can be designated as the new main image of a unique object entity by comparing with the existing main image if there is any.

This refined process ensures precision in isolating and processing the OOI for subsequent identification or training. A comparable technique for eliminating irrelevant or background elements can be applied to data from various modalities such as odor, taste, tactility, and sound.

Figure 3:
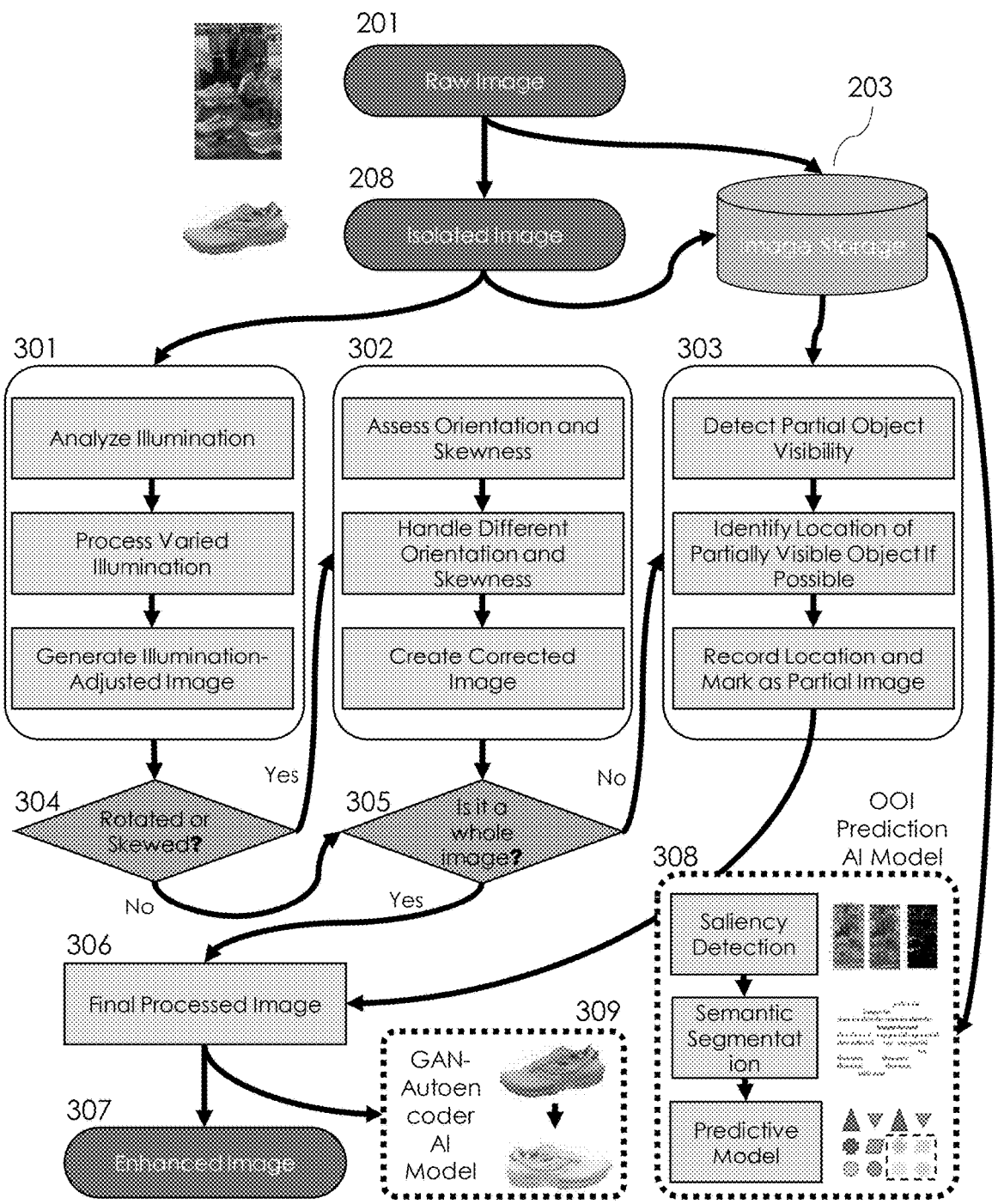
FIG. 3 illustrates a sample raw query image and the system's capability to process varied illumination, orientation, skewness, and partial object visibility, as well as AI models for prediction and enhancement of the object of interest.

FIG. 3 presents a flow diagram illustrating the enhancement and localization process 300 of the isolated image 208 prior to its identification or training, in line with the methods detailed in the current disclosure.

In a preferred embodiment of the present invention, to standardize the image across various lighting conditions, an illumination adjustment process 301 is implemented which can involve full or partial normalization of the image and/or application of an auto-leveling process. If the image exhibits rotation, skewing, or mirroring, the perspective correction process 302 is applied to rectify variations in orientation, skewness, and mirrored representations. Additionally, in instances where the image represents only a part of an object, the partial image localization process 303, is employed. This process determines the location of the partial image within the comprehensive frame of the main image of the unique object entity stored in image storage 203. The location and scale data of the partial image is then carried to subsequent stages and ultimately recorded in the object information database 800.

Once the enhanced image 307 is created, it is matched with the corresponding isolated image 208 to establish a cohesive image pair dataset. This image pair dataset is carried to the next stage and stored in the enhanced image pair storage 401, for training the Generative Adversarial Network (GAN)-autoencoder AI model 309. This integration enables the automatic enhancement of isolated images in future operations. Detailed descriptions and illustrations of the GAN-autoencoder AI model 309 are included in the sections discussing FIG. 12.

Figure 4:
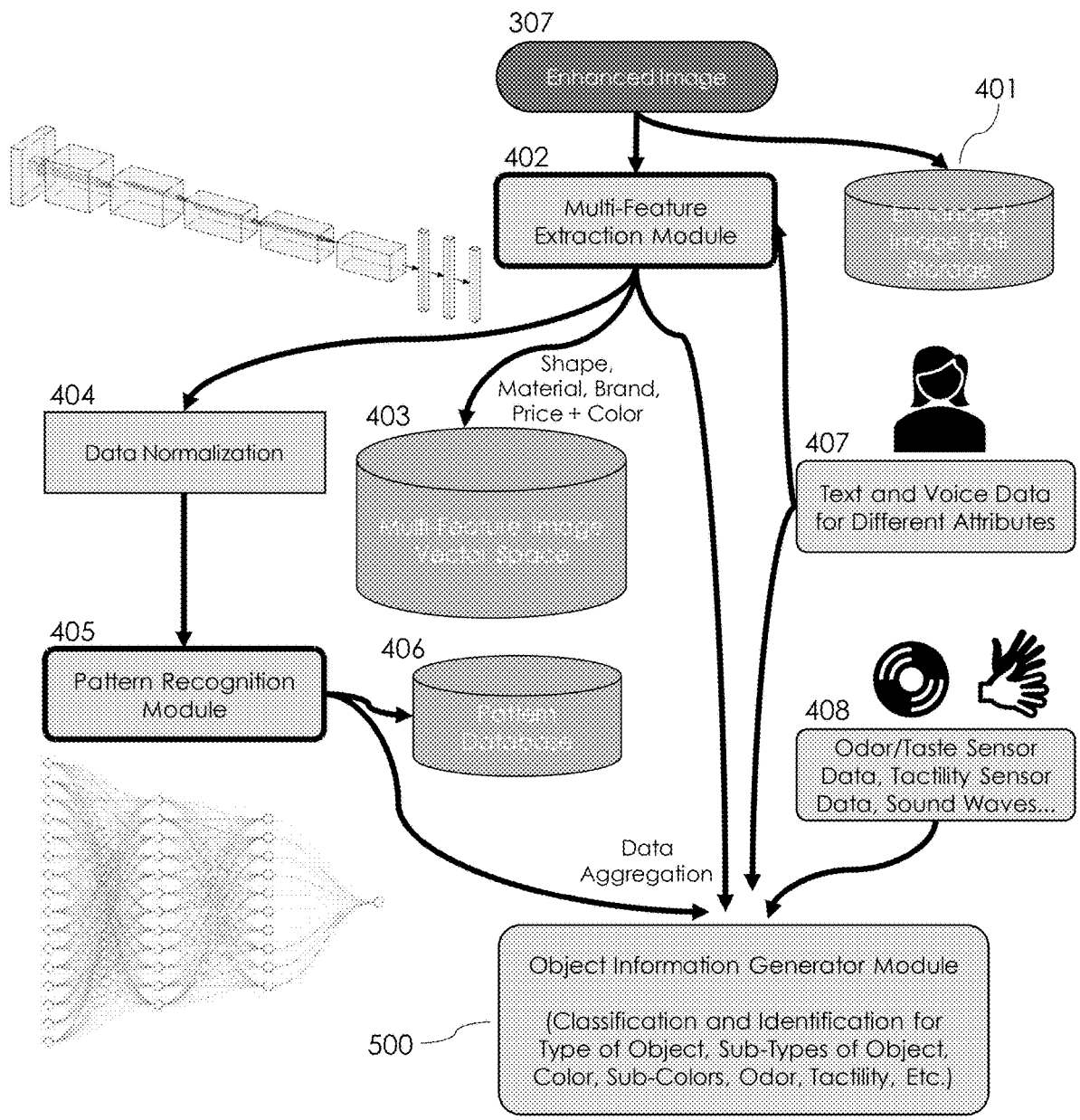
FIG. 4 provides a diagram detailing the data gathering and feature extraction process from initial image or multi-modal data input through various system modules to classify and store different characteristics the object.

Turning now to FIG. 4, an illustration showing a system 400 for gathering, training AI models, storing embeddings of images and patterns to data spaces, and combining with various input to be used to characterize an object, in accordance with implementation of the present disclosure, is provided. The enhanced image 307 along with isolated image 208 is firstly stored in 401 as described previously. Subsequently, the enhanced image 307 alongside the text and voice data for different attributes 407 are processed by the feature extraction module to be converted into embeddings, a vectorized format of the object information at a lower dimension. A plurality of embedding types such as type of object, material, brand, and price, classified and identified from the image and user's input or interface from external systems, is extracted by multi-feature extraction module 402, where the price information can be provided by an administrator or through other mechanisms, and stored in the multi-feature image vector space 403.

The system first converts the image to black-and-white for the purpose of conducting a shape similarity search. Then, the system identifies textual labels for the image, including brand and price information, in order to find objects of similar brands and a similar price. The black-and-white network, which can be a Convolutional Neural Network (CNN) trained to understand shapes and textures without the influence of color, and the color network can be another CNN which focuses on color features. Then, Optical Character Recognition (OCR) or Natural Language Processing (NLP) techniques can be utilized to process labels for criteria that include brand and price. This system then converts information into vectorized embeddings. Image features from the black-and-white network and the color network, as well as textual embeddings, are fused by various fusion techniques that can include simple concatenation or more complex methods. Detailed descriptions and illustrations of the process of building the multi-feature image vector space 403 can be found in the sections relating to FIG. 13.

Following this multi-feature extraction, the system further normalizes the black-and-white and color image embeddings through the data normalization process 404 to pass the data to the pattern recognition module 405 through AI training such as various types of neural networks. The pattern recognition module 405 stores the model into pattern database 406. It performs tasks that can include classifications of the object, which are detailed in the next section.

Figure 5:
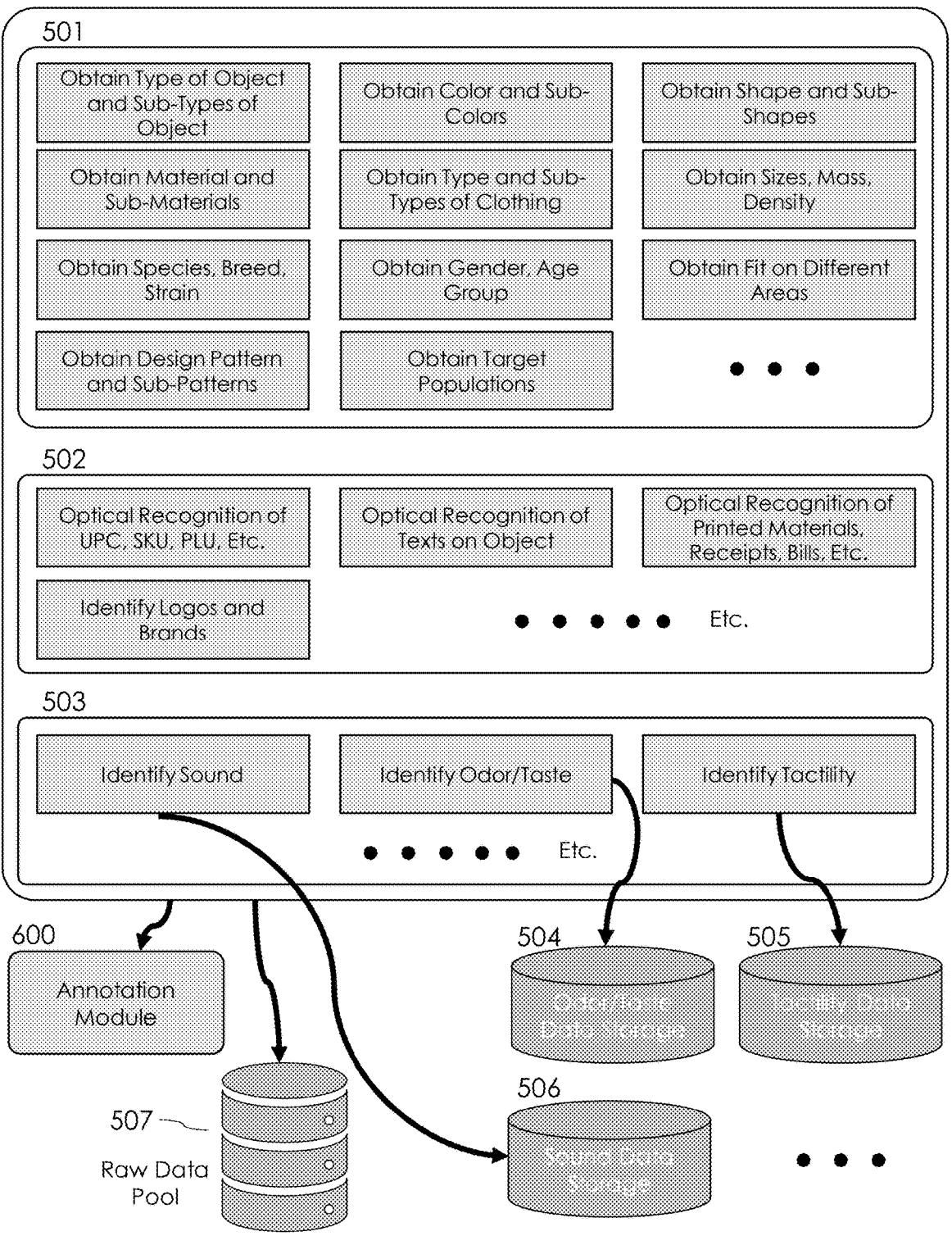
FIG. 5 presents a structure of object information generator module for identification and recognition of a variety of visual and textual data.

In FIG. 5, the object information generator module 500, that obtains semantic and numeric information about each unique object entity, is illustrated. The object identification process 501 leverages the data collected from earlier stages, alongside various inputs from the querying device 103 that include user's text and voice data for different attributes 407, along with odor and taste sensor data, tactility sensor data, and sound waves 408. It utilizes a suite of pre-trained artificial intelligence models to categorize an input object based on numerous attributes.

These attributes encompass, but are not limited to, the type and sub-types of the object, its color and various sub-colors, shape and sub-shapes, material and sub-materials utilized in its construction. Additionally, this process extends to identifying the type and sub-types of clothing, dimensions including size, mass, and density, as well as biological classifications such as species, breeds, strain, alongside demographic attributes like gender, age group, fit (slim, regular, lose, etc.) for different body areas, and design patterns including sub-design patterns, as well as target populations.

Concurrently, the text and brand identification process 502 is engaged in the extraction of textual, numerical, and symbolic data from the object. This data is essential for capturing both semantic and numerical information, including Universal Product Codes (UPC), Stock Keeping Units (SKU), Price Look-Up codes (PLU), as well as any text, logos, and brand names present on the object. It also encompasses various details found on the printed materials and screenshots relating the object's information, which include, but are not limited to, promotional materials, manuals, catalogs, boxes, wrappers, screens, displays, signs, tags, receipts, invoices, packing lists, and bills. This includes information such as the price, specifications, dimension, weight, size, manufacturer, seller, and outlet.

The outcomes of both the object identification process 501 and the text and brand identification process 502 are consolidated into a raw data pool 507. Following this, the multi-modal identification process 503 processes and stores data related to the object's odor, taste, tactility, and auditory characteristics which can be obtained by various sensors, manual input of text and voice, data extraction from various descriptions or data interface from a remote source. This multi-modal data, encapsulated in textual and/or numerical formats, is stored respectively in odor/taste data storage 504, tactility data storage 505, and sound data storage 506.

Finally, all collected data from the object identification process 501, the text and brand identification process 502, and the multi-modal identification process 503 are conveyed to the subsequent stage, namely the annotation module 600.

Figure 6:
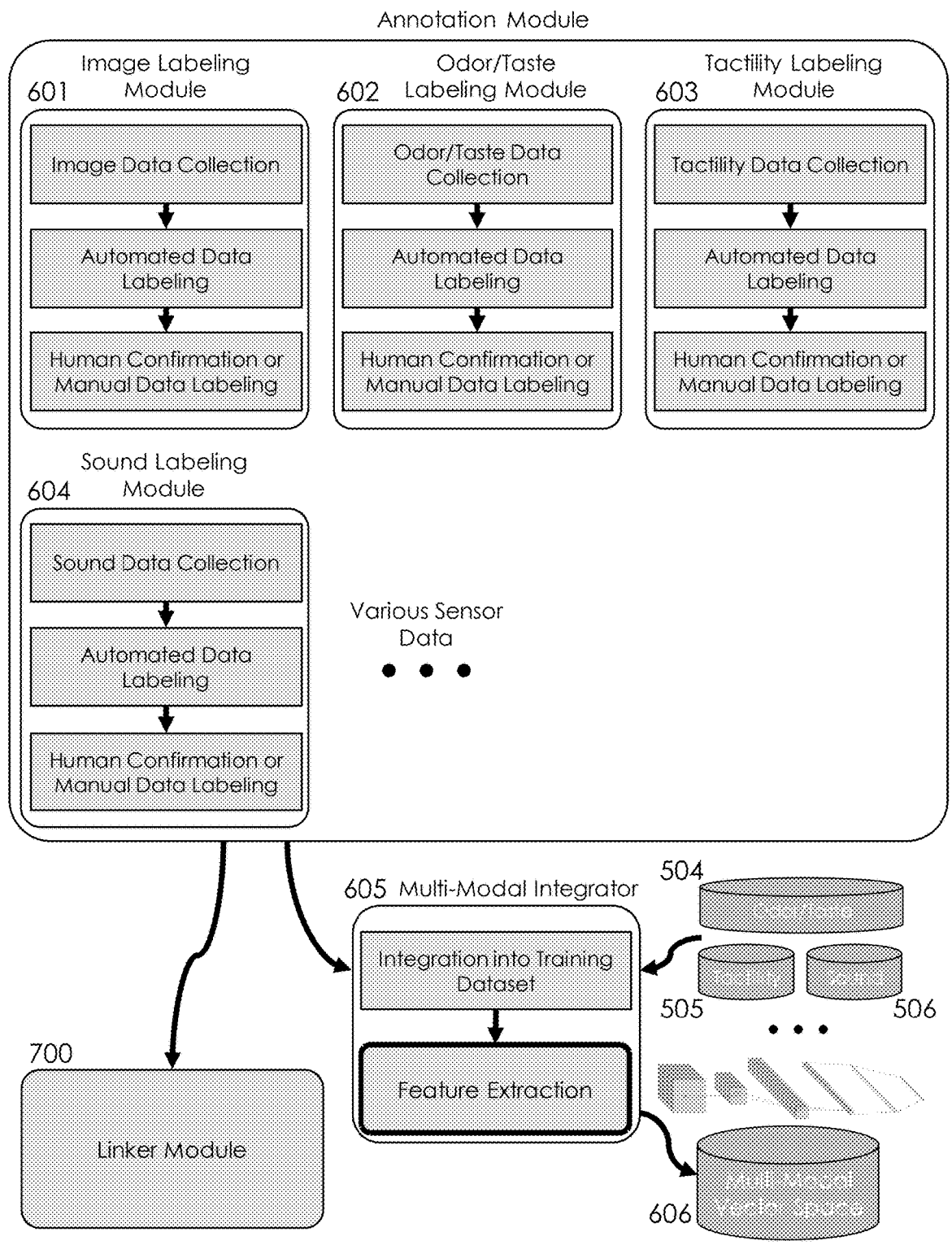
FIG. 6 explains the process of creating annotations for different modality data, and the multi-modal integrator AI model, along with relevant data spaces.

With regard to FIG. 6, the present invention discloses an annotation module 600 that utilizes a multitude of labeling sub-modules for generating annotations associated with an object, which are subsequently employed to produce multi-modal embeddings and passed to the linker module 700, optionally utilizing supervised or unsupervised learning techniques. The invention encompasses an image labeling module 601, which has the capability to employ various pre-trained AI models for the purpose of annotating images. These annotations may include object identification, attribute recognition, or other relevant information pertaining to the visual content. Furthermore, human administrators are incorporated into the system to validate and rectify these annotations as needed. Alternatively, each individual image may undergo manual labeling by a human administrator to ensure high accuracy.

Similarly, the invention comprises an odor/taste labeling module 602 that performs operations akin to the image labeling module. This module is designed to annotate odorous and tasty characteristics associated with the object. These annotations may encompass scent profiles, odor classifications, taste classifications or any pertinent information related to olfactory and taste attributes. Human administrators play a role in confirming, adjusting or manually creating these annotations for accuracy. The tactile attributes of the object are processed by the tactility labeling module 603, which functions analogously to the image and odor labeling modules. It is responsible for annotating tactile properties, such as texture, temperature, or other haptic characteristics of the object. Human administrators are integrated into the process to validate, modify or manually enter these annotations as necessary. Additionally, the invention includes a sound labeling module 604 that performs operations similar to the aforementioned labeling modules. This module focuses on annotating auditory attributes associated with the object, which may include sound profiles, noise classifications, or relevant sound-related information. Human administrators are integrated to confirm, adjust or manually record these annotations for accuracy.

It should be noted that the system may also incorporate data from various other types of sensors or different channels of input to enhance the uniqueness and comprehensiveness of the annotations generated by the labeling sub-modules. Once a substantial amount of data has been labeled, the system can utilize this extensive dataset, comprising image and other sensory characteristics alongside human-validated annotations, to develop highly precise AI labeling models. This advanced approach aims to eliminate the necessity for ongoing human intervention in the labeling process, as the AI models will have been trained to autonomously and accurately annotate new data in the future.

The raw text and numeral data from the odor/taste data storage 504, the tactility data storage 505, and sound data storage 506 are integrated to multi-modal integrator 605. These data along with annotations of each property are fused together to produce multi-modal embeddings. The methods used to produce fused data can include, but are not limited to, multi-head attention, single head attention, or simple concatenation. Detailed explanations and illustrations for building the multi-modal vector space 606 are provided in the section dedicated to FIG. 14.

Figure 7:
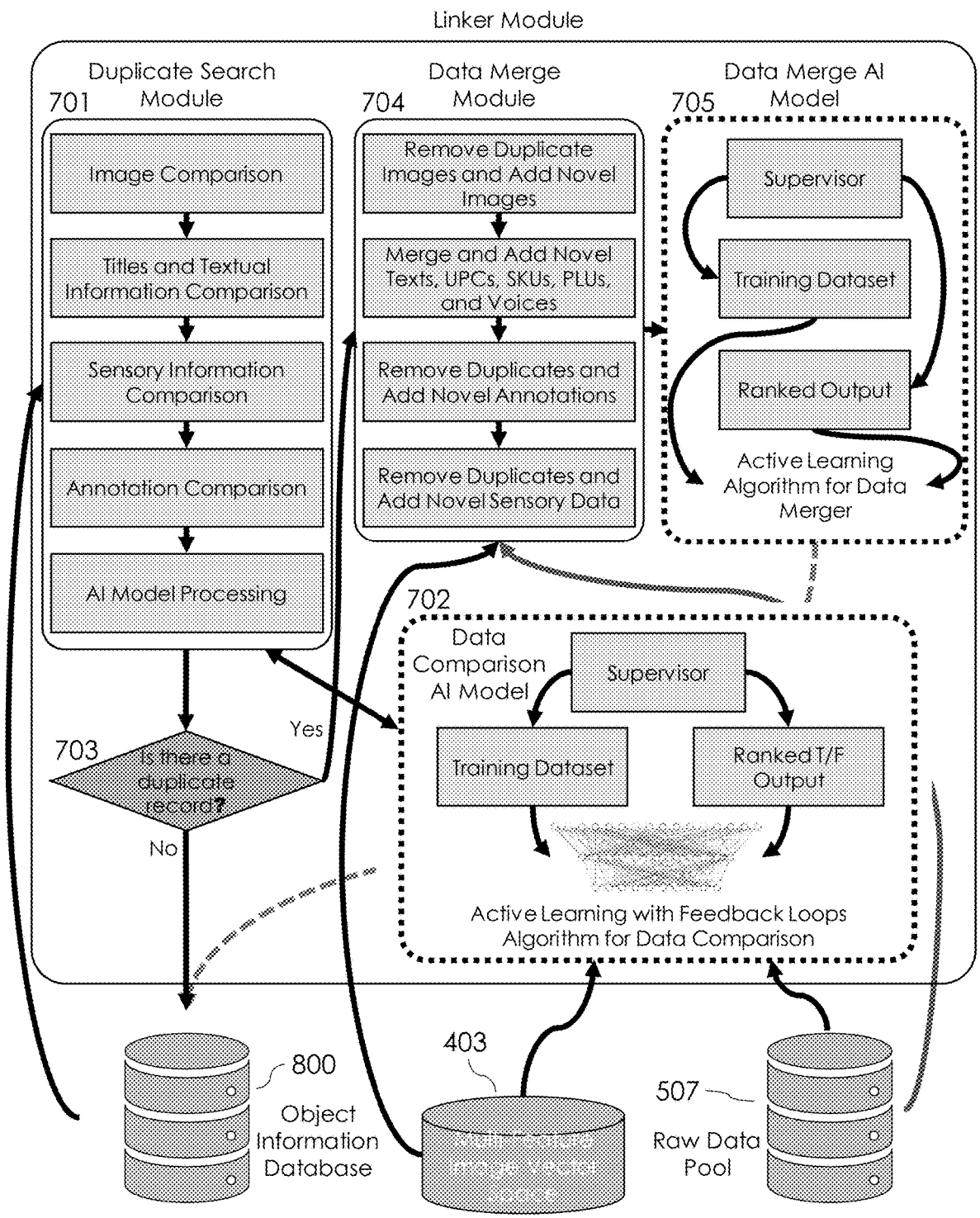
FIG. 7 depicts the linker module's functionality, illustrating its role in matching AI analysis results and merging records with database entries and the training process.

In reference to FIG. 7, the depicted embodiment illustrates an exemplary process for the amalgamation of all pertinent information and data sources gathered in preceding stages, aimed at achieving a comprehensive characterization of a specific object. The linker module 700 strategically consolidates all available data related to a specific object entity and stores them as a single entry for each object in a Relational Database Management System (RDBMS) referred as object information database 800. This is achieved by employing two active learning with feedback loops AI models: the data comparison AI model 702, which is responsible for assessing and identifying similarities between data points, and the data merge AI model 705, which integrates these data points into a unified record. The significance of this step lies in its ability to facilitate accurate identification of the object, thereby avoiding the possibility of creating multiple, disparate database entries for the same object. A person skilled in the art will recognize that different types of database management system other than RDBMS may also be employed for storing aforementioned information.

The data comparison AI model 702 is utilized in the identification and management of duplicate records within the object information database 800. This model, an embodiment of an active learning algorithm, discerns and evaluates potential duplicates among the vast array of records housed in the database. Detailed descriptions and illustrations of the data comparison AI model 702 are depicted in the sections discussing FIG. 15.

After the operation of comparison by the data comparison AI model 702, a decision point 703 determines the next step based on whether a duplicate record is found or not. If there's no duplicate object in the database, the system records all the textual and numerical information in the database. If the object is a commercially sold item, the system utilizes the UPC as one of unique keys designated for the database. If there are one or more similar object entries in the database, the data merge module 704 employs the data merge AI model 705 to merge one or more existing database entries and the new information into a single database entry for each unique object entity. Detailed descriptions and illustrations of the data merge AI model 705 are included in the sections discussing FIG. 16.

The result of aforementioned duplicate search and merge operations is a highly efficient and accurate system that significantly enhances the integrity and usability of the object information database 800, serving as an indispensable tool in the management and organization of data within this patent's scope.

Figure 8:
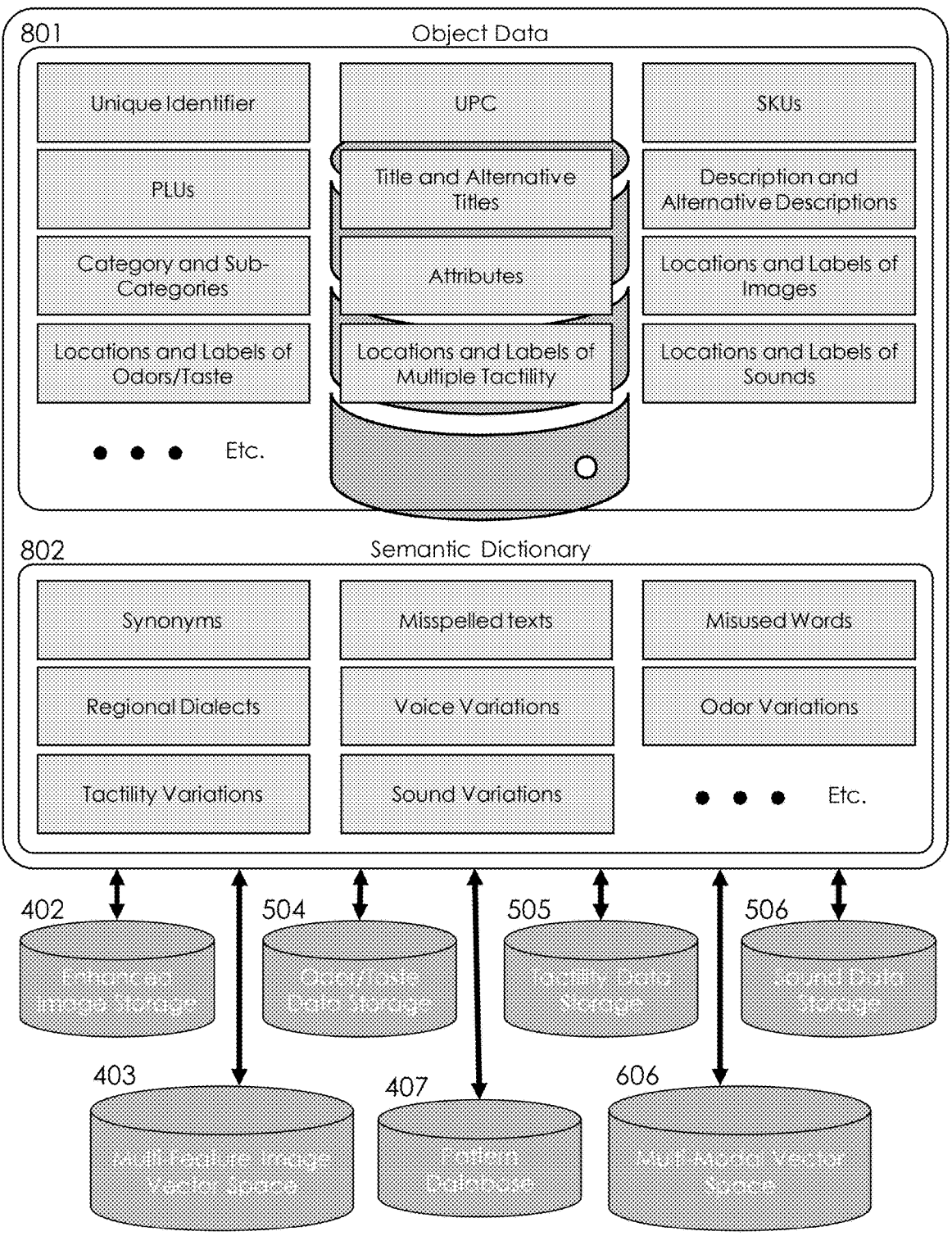
FIG. 8 illustrates the structure of the object information database, indicating the storage and relational linking of diverse object data types accompanied by semantic dictionary.

FIG. 8 illustrates the structure of the object information database 800 comprising mainly two database tables or instances: object data 801 and semantic dictionary 802. These tables interact with various storage spaces. The object information database 800 may be implemented as either a relational database or a non-relational database. However, for the illustrative embodiment of the present disclosure, a Relational Database Management System (RDBMS) has been chosen as the preferred implementation. The database table referred as object data 801 incorporates an array of database fields that encompass, but are not limited to, the following: a unique identifier, UPC, SKUs, PLUs, primary titles, alternative titles, primary descriptions, alternative descriptions, category, alternative categories, sub-categories, and various attributes. Furthermore, the object data 801 comprises the locations on disk and/or the file names of associated image files, odor files, taste files, tactility files, sound files, and related data contained within the respective storage spaces 402, 504, 505, and 506. The object data 801 further encompasses database fields for labels corresponding to images, odor/taste profiles, tactility characteristics, sounds, and other types of attributes.

For the purpose of avoiding complete reformation of various vector spaces in the invention every time some data need to be added or deleted, following methods of reducing the dimensions of feature vector for each criterion or attribute into a single dimension for using RDBMS is used. Firstly, standardized data matrix $X_{std}$ is calculated with $X_{std}=(X-\mu)/\sigma$ where $\mu$ is the mean and $\sigma$ is the standard deviation. Then covariance matrix $\Sigma$ is calculated using $\Sigma=(1/(n-1)) X_{std}^T X_{std}$ where n is the number of data points. This is followed by calculating eigenvalues for each eigenvector by solving $det(\Sigma-\lambda I)=0$ and $(\Sigma-\lambda I)v=0$ where $\lambda$ is the eigenvalue and v is the eigenvector. Then, the eigenvector with the largest eigenvalue is chosen. Finally, the scalar value of this single dimensional vector, which is based on the axis that shows the greatest variance, is normalized to fall between integer values from 0 to 99 which can be expanded to a greater range if needed.

Alternatively, if the labels exist for each attribute, within-class $S_W$ is calculated using $S_W=\Sigma_{i=1}^{c} S_i$ where $S_i$ is the scatter matrix for each class. Between-Class $S_B$ is also calculate with $S_B=\Sigma_{i=1}^{c} N_i(m_i-m)(m_i-m)^T$ where m is the overall mean, and $m_i$ and $N_i$ are the sample mean and sizes of the respective classes. This is followed by calculating eigenvalues for each eigenvector by solving $det(S_W^{-1}S_B-\lambda I)=0$ and $(S_W^{-1}S_B-\lambda I)v=0$ where $\lambda$ is the eigenvalue and v is the eigenvector. Subsequently, the eigenvector with the largest eigenvalue is chosen. The goal is to find the vector w (weights or coefficients of the linear discriminant) that maximizes the function $J(w)$ using $J(w)=w^T S_B w/w^T S_W w$. Finally, the scalar value of this single dimensional vector, which is based on directions that best separate different classes in a dataset, is normalized to fall between integer values from 0 to 99 that can be expanded to a greater range if needed.

The resulting number is simple one hundred clusters of each attribute that are stored in RDBMS as integers for classification of each object. This allows the system to utilize versatile functions of RDBMS. as well as the ease of adding and deleting object records. It can also enable easy schema alterations without downtown or restructuring as well as adding or removing dimension. It's also advantageous in triggering automated data manipulation and normalization. Scaling, partitioning, backing up and recovery is far easier than conventional vector spaces. It can also accommodate complex querying across different modalities by utilizing the powerful properties of Standard Query Language (SQL) such as, sub-query, INNER JOIN, OUTER JOIN, DISTINCT, COUNT, GROUP BY, ORDER BY etc., which any type of present vector spaces cannot offer.

Additionally, the aforesaid table interfaces with various integral components, including the image vector space 404, the pattern database or vector space designated as 406, and the multi-modal vector space 606. These interactions facilitate the system's retrieval of raw image files, multi-modal data, and assorted object data of diverse nature. In instances where multiple titles, descriptions, categories, various attributes, or various types of labels are associated with an object, a foreign key within the original table is established, which is correlated with the primary key index of a separate table. This approach is employed to effectively manage and maintain the information pertaining to titles, descriptions, categories, various attributes, and various types of labels.

This data space is expected to experience significant growth in size and will be subject to frequent and recurrent data overwriting operations. In order to ensure optimal performance of the table, a scheduled periodic index defragmentation and log truncation job can be implemented. This proactive measure serves to enhance the overall efficiency of the table. Additionally, to prevent any degradation in system performance, aging data can be partitioned and/or archived, thus averting any adverse impact on system responsiveness.

To facilitate the efficient retrieval of objects of interest, even in cases of partial or misleading query data, a table referred as semantic dictionary 802 is presented within the framework of this disclosure. The semantic dictionary 802 is composed of a set of thesauri, each encompassing a repository of pertinent linguistic resources. These resources include collections of synonyms, collections of misspelled textual representations, and collections of frequently misused expressions, corresponding to each term or word contained within the dictionary. Moreover, the semantic dictionary 802 incorporates a comprehensive compilation of assets, including but not limited to: a lexicon of regional dialects, an inventory of variations in vocal expressions associated with individual terms or tokens, repositories of odor and taste descriptors, a lexicon of descriptions pertaining to tactility, and a lexicon detailing variation in auditory attributes, among others. When keywords or values for different modalities are entered into the system's search mechanism, it initiates searches not only for the exact keyword but also for synonyms, misspelled variants, misused terminology, regional dialectic disparities, and variations associated with each modality.

Furthermore, the system is designed to adapt and expand its semantic dictionary 802 based on user input, thereby allowing for the incorporation of newly identified misspelled or misused words or tokens into its linguistic resources. This dynamic feature enhances the system's capacity to refine and improve its semantic understanding over time.

Figure 9:
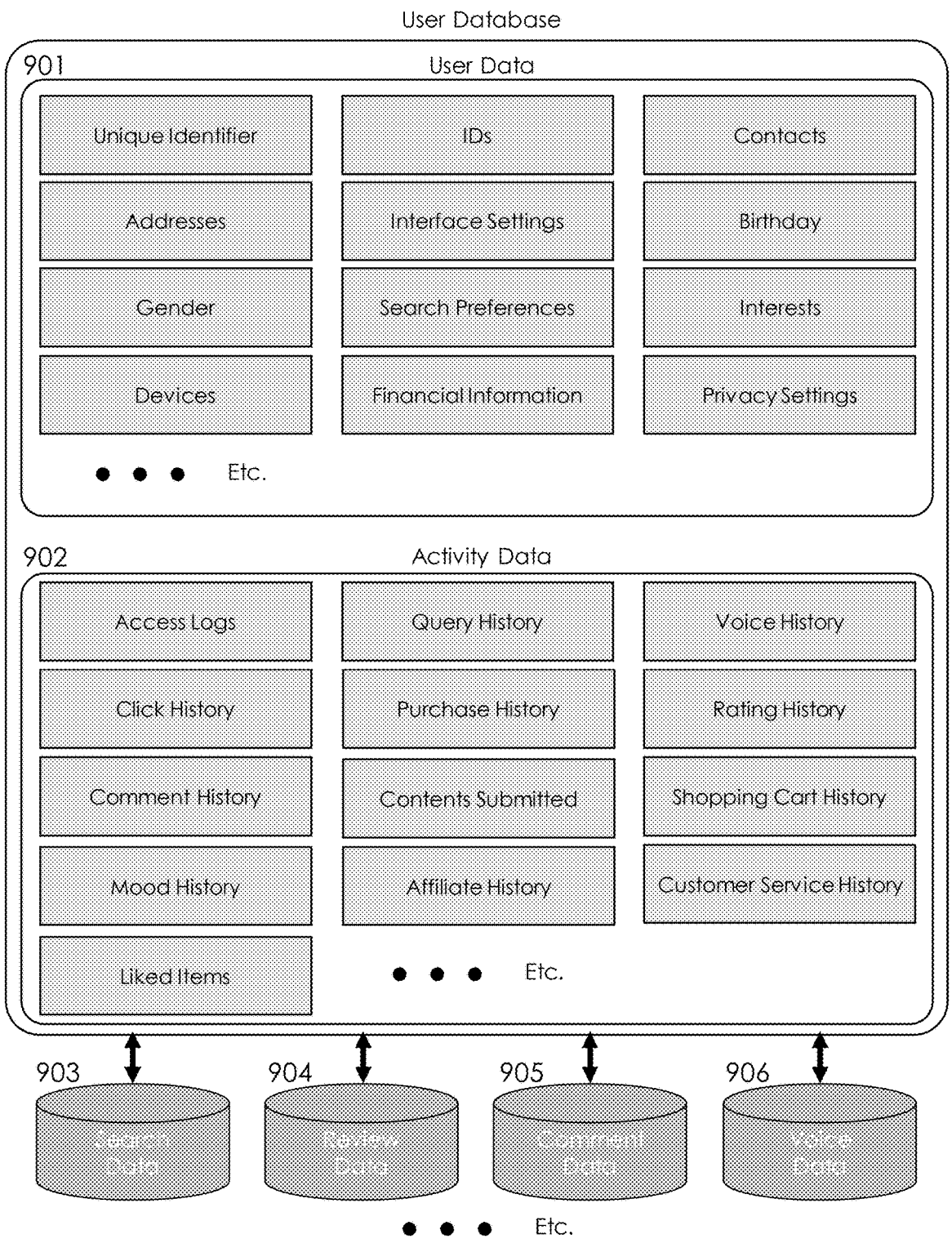
FIG. 9 illustrates the structure and functionality of the user database, illustrating how it captures and utilizes user information, preferences, and history.

FIG. 9 illustrates an exemplary structure of the user database 900 comprising mainly two database tables or instances: user data 901 and activity data 902. The user database 900 may be implemented as either a relational database or a non-relational database. The database table referred as user data 901 incorporates an array of database fields that encompass, but are not limited to, the following: a unique identifier, IDs, contacts, addresses, interface settings, birthday, gender, search preferences, interests, devices, financial information, privacy settings, and other data.

For the purpose of utilizing this data effectively as contextual information for recommending objects or prioritizing the order of search results, this disclosure introduces a table known as activity data 902. The activity data 902 comprises a structured collection of database fields, including but not limited to: access logs, query history, voice interactions history, click history, purchase history, rating history, comment history, user-generated content submissions, shopping cart activities, mood-related historical data, affiliate engagement history, customer service interactions history, favorited items, and various other relevant data categories. Furthermore, the activity data 802 establishes interfaces with repositories such as search data 903, review data 904, comment data 905, voice data 906, and other data repositories. These repositories aggregate information from diverse users, enabling the system to read and write pertinent data for the purpose of enhancing the prioritization of search results.

In situations where an array of data is present within any given database field, as opposed to a single data point, a foreign key within the original table is established, which is correlated with the primary key index of a separate table.

Furthermore, beyond the system's aforementioned capability of considering diverse elements within a user's profile and activities, it can also employ emotional states and physiological indicators to enhance the prioritization of object exposure. These indicators encompass a range of metrics, including brain wave patterns, eye movement data, blood pressure readings, heart rate measurements, data derived from physiological organs, as well as personal data including tonal qualities of the user's voice, linguistic expressions, behavioral patterns, physical attributes, possessions, tools utilized, and instinctual responses. The collective integration of these elements significantly augments the system's ability to conduct contextually informed searches and deliver personalized recommendations.

Figure 10:
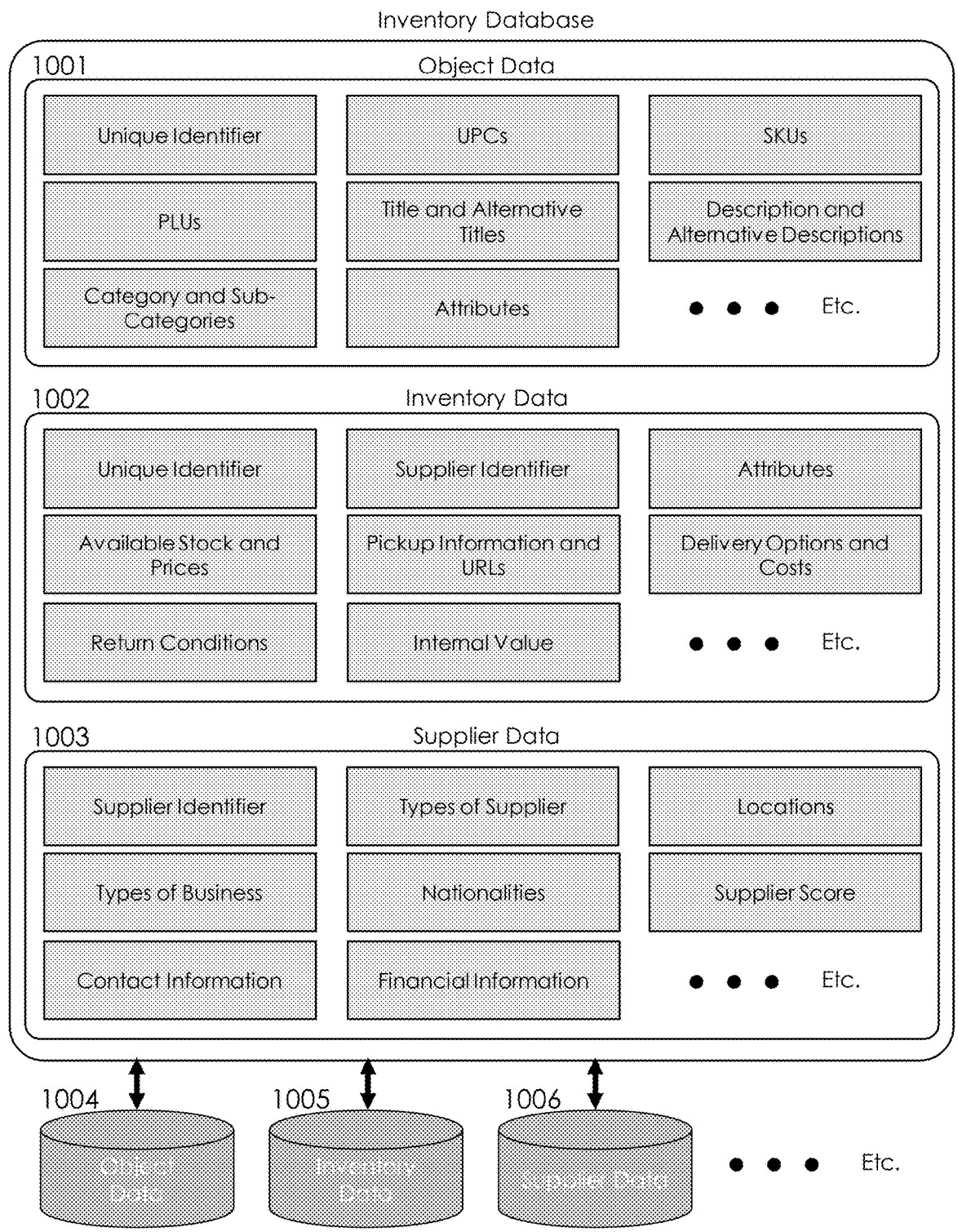
FIG. 10 presents a diagram of the inventory management system, detailing its data structure and its interface with various data storage spaces.

FIG. 10 illustrates the structure of the inventory database 1000 comprising mainly three database tables or instances: object data 1001, inventory data 1002, and supplier data 1003. The inventory database 1000 may be implemented as either a relational database or a non-relational database. The database table referred as object data 1001 incorporates an array of database fields that encompass, but are not limited to, the following: a unique identifier, UPCs, SKUs, PLUs, titles, alternative titles, descriptions, alternative descriptions, category, alternative categories, sub-categories, various attributes, and other data. To provide clarity, the object data 1001 serves the purpose of presenting comprehensive object details, primarily intended to furnish users with standardized information. On the other hand, the object information database 800 primarily serves the function of facilitating the search for analogous objects.

For the explicit purpose of identifying available objects for purchase and furnishing pertinent acquisition information, the utilization of inventory data 1002 aligns with the principles in this disclosure. The inventory data 1002 constitutes a structured collection of database fields include, but not restricted to, the following: unique identifier, supplier identifier, attributes, stock availability, pricing details, pickup particulars, delivery related information and associated costs, return policies, internal valuation metrics, URLs, and other relevant data categories. Additionally, a database table referred as the supplier data 1003 has been established to optimize the arrangement of search results. The supplier data 1003 comprises an array of database fields that encompass, but not restricted to, the following: supplier identifier, supplier types, geographical locations, business classifications, nationalities, supplier performance ratings, contact details, financial information, and other pertinent attributes.

In situations where an array of data is present within any given database field, as opposed to a single data point, a foreign key within the original table is established, which is correlated with the primary key index of a separate table.

The invention harnesses data stored within the inventory database 1000, encompassing information pertaining to object availability, pickup and delivery alternatives, estimated arrival time for the user or delivery schedules, associated costs, and online access URLs. This database serves as the foundation for the system's capacity to furnish a comprehensive list of identified objects, replete with accessibility and acquisition details. The system's search functionality extends to accommodate geographical constraints in accordance with user preferences, location or regional specifications. Additionally, the search parameters encompass temporal elements such as time of day, day of the week, day of the year, specific holiday dates, weather conditions, and economic indicators such as stock index, monthly GDP, unemployment rate, consumer price index, producer price index, interest rates, inflation rates, wages, etc. Moreover, the system is designed to assign higher relevance weights to objects and products based on their intrinsic value as impartially assessed by the system, even in cases where such items may be less popular or offered by smaller providers. This dynamic approach enhances the system's ability to present users with tailored and meaningful search results and recommendations.

Figure 11:
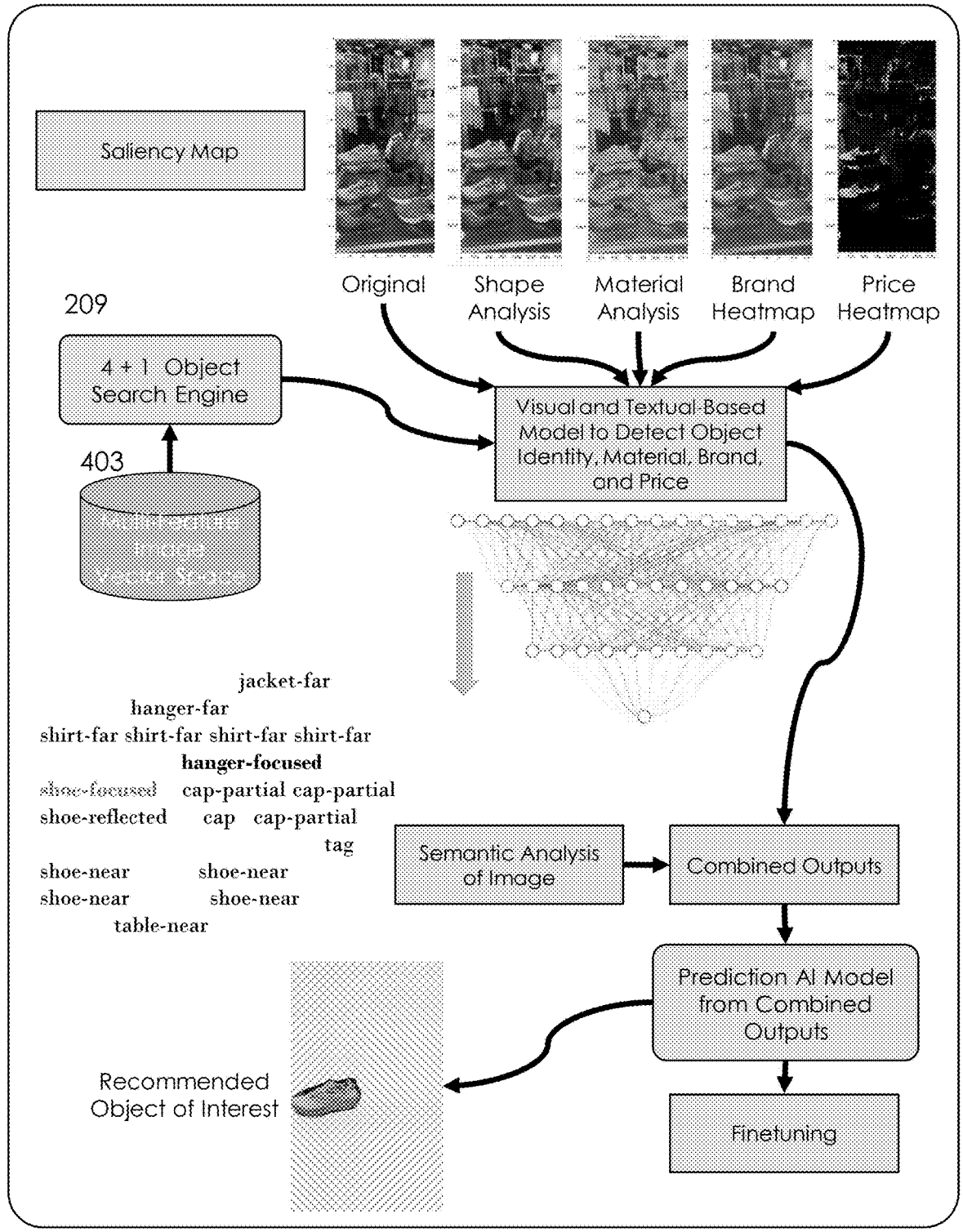
FIG. 11 provides a diagram of object of interest prediction AI model and its utilization of saliency map and semantic analysis.

In reference to FIG. 11, the depicted embodiment illustrates Object of Interest (OOI) prediction AI model 308. OOI prediction AI model 308 initiates its operation by applying saliency detection algorithms to the raw image 201. This phase focuses on converting the image into grayscale and/or black-and-white representations to identify the shape of objects, and identifying materials, brands, prices of objects, and producing heatmaps of materials, brands, and prices by utilizing pre-trained AI models. These representations effectively become saliency maps that highlight areas of potential interest within the image. These various operations are also executed using the multi-feature image vector space 403. The system further incorporates the most sharply focused area or the area of the shortest distance, the most relevant brand to the user, and/or an object with the highest price or the price range relevant to the user. Following this, the model employs advanced semantic segmentation techniques, by ruling out objects that are identified as irrelevant objects including mannequins, stands, mounts, holders, human/animal models, decorations, and signs. The system then employs a predictive AI model to process the information gathered from preceding operations to identify the most significant object to the user within the image.

The system then utilizes image storage 203, where pairs of raw and isolated images are stored, to identify patterns and relationships of the raw image and the isolated image to train a predictive AI model. The training process of this predictive algorithm involves feeding both the isolated and raw images, enabling it to learn and recognize patterns and characteristics of the OOI utilizing AI algorithms such as Convolutional Neural Networks (CNN). This trained model is applied to predict an OOI from the resulting portion of the image from the salience detection and semantic segmentation processes.

Figure 12:
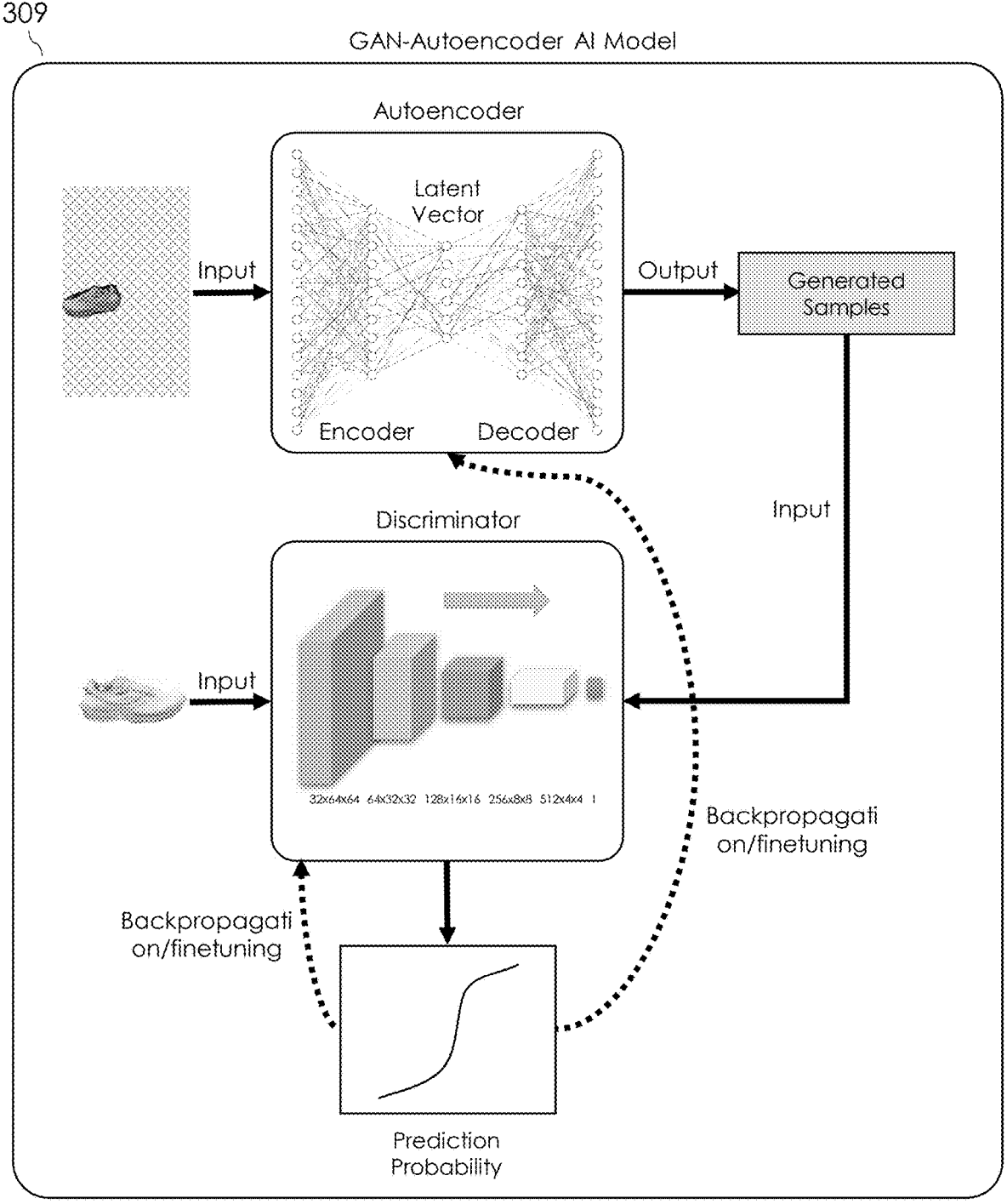
FIG. 12 explains the process of GAN-autoencoder AI model for producing an enhanced image from a raw image based on an array of enhanced image database.

The current invention, as illustrated in FIG. 12, introduces an innovative image enhancement technique utilizing a Generative Adversarial Network (GAN). This approach differs from conventional GAN applications, which typically create images from random noise. Instead, this method focuses on enhancing existing images using the capabilities of GAN technology. In this AI model denoted as GAN-autoencoder AI model 309, the autoencoder serves as the generator within the GAN. The process begins with training the autoencoder to learn a compact representation of the isolated image 208. This autoencoder consists of two parts: an encoder, which compresses the input image into a lower-dimensional latent space, and a decoder, which reconstructs the image from this latent representation. The autoencoder learns the underlying patterns and structures of the images. Once the autoencoder is trained, it is integrated into the GAN framework. In this setup, the trained decoder of the autoencoder functions as the generator in the GAN. The discriminator in the GAN is trained to differentiate between the newly enhanced images produced by the generator and the previously enhanced images 307 from the training dataset In FIG. 13, the illustrated preferred embodiment employs multi-feature embeddings designed for object search based on various criteria other than the color of the object. Unlike most image search methods that primarily use color as the only search criterion or the default search criterion, this approach regards color as an optional criterion. This functionality is achieved by implementing a novel method of a multi-head attention mechanism on the combined embeddings and separately implementing a model is specifically trained to handle the aspect of color configuration of the image in the search process.

In accordance with the implementation of the present disclosure, four plus one (4+1) embedding are used. These are (a) shape (or object identity) embedding obtained from the black-and-white (or grayscale) neural network, (b) material (or texture) embedding obtained through visual classification, tactility data and/or semantic input, (c) brand embedding obtained through OCR and/or any NLP technique, (d) price embedding by converting price into an appropriate numerical format-based embedding, plus (e) color embedding through the separate color network. The concatenated or stacked embeddings of the first four attributes (a), (b), (c), and (d) are input to an attention mechanism. The system possesses query, key, and value. Key and value are attribute embeddings such as (a), (b), (c), and (d). A multi-head or single head attention score is computed by comparing the query with each key, through a scaled dot product or a simple neural network. The attention score can also be obtained by utilizing regular dot product or more complex learned functions.

A softmax function is applied to the attention scores to convert them into probabilities. Each value is multiplied by its softmax score, and the sum of these products of vectors is a context vector. The context vector represents a fused embedding, highlighting features from each attribute based on their relevance to the query. The fused embedding is used to search for objects with similar shape, material or texture, brand, and price regardless of the color distribution of the object image. A loss function such as ranking loss, cross-entropy loss, mean squared error or combination of any of these is attached to the above to perform non-color multi-attribute searches. If the user indicated to search for similar colors also, a separate search result for color embedding (e) is employed to produce a combined result with the non-color attribute search result by prioritizing common objects from these two separate searches.

Figure 14:
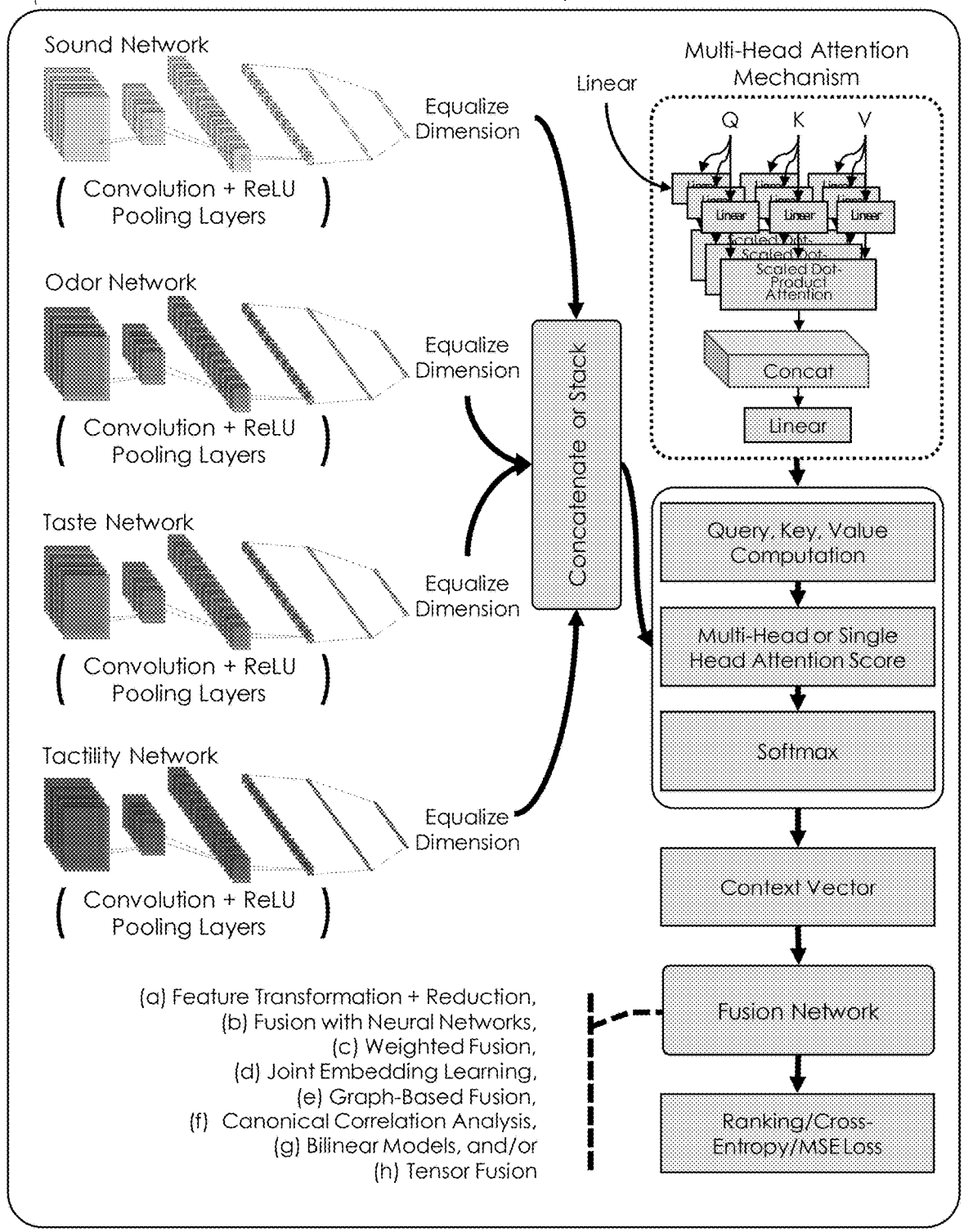
FIG. 14 provides a diagram of the multi-modal vector space, detailing the process of fusing embeddings of different modalities.

With regard to FIG. 14, the present invention discloses an exemplary technique for fusing odor, taste, tactility, and sound embeddings. The concatenated or stacked embeddings of these four types of data consisting of raw data and annotations of each property are input to an attention mechanism. The system possesses query, key, and value. A multi-head or single head attention score is computed by comparing the query with each key, through a scaled dot product or a simple neural network. The attention score can also utilize dot product or more complex learned functions.

A softmax function is applied to the attention scores to convert them into probabilities. Each value is multiplied by its softmax score, and the sum of these products of vectors is a context vector. The context vector represents a fused embedding. The fused embedding is used to search for objects with similar look, smell, taste, tactility, and sound. A loss function such as ranking loss, cross-entropy loss, mean squared error or combination of any of these will be attached to the above to perform multi-modal searches.

Additionally, various techniques is further employed to refine the multi-modal embeddings at the fusion network stage before the loss function. These techniques include, but are not limited to, (a) feature transformation and reduction where dimensionality reduction techniques or transformation methods such as autoencoders to transform the vector into a more compact representation, (b) fusion with neural networks where a fully connected deep neural network or a more complex structure like a capsule network is utilized, (c) weighted fusion where the context vectors from each modality is combined using learned weights that indicate the importance of each modality for the task, (d) joint embedding learning where the fusion network trains a joint embedding space where vectors from different modalities are mapped close to each other if they correspond to the same concept or object, (e) graph-based fusion where a graph-based approach where nodes could represent features from different modalities and edges could represent the learned relationships between these features, (f) canonical correlation analysis is to find the correlations between two sets of modalities and fuse the information into a common space where the correlations are maximized, (g) bilinear models or (h) tensor fusion where the model multiplies the features from one modality with those of another to create a matrix or tensor of combined features, or (i) a combination of any of the above.

Figure 15:
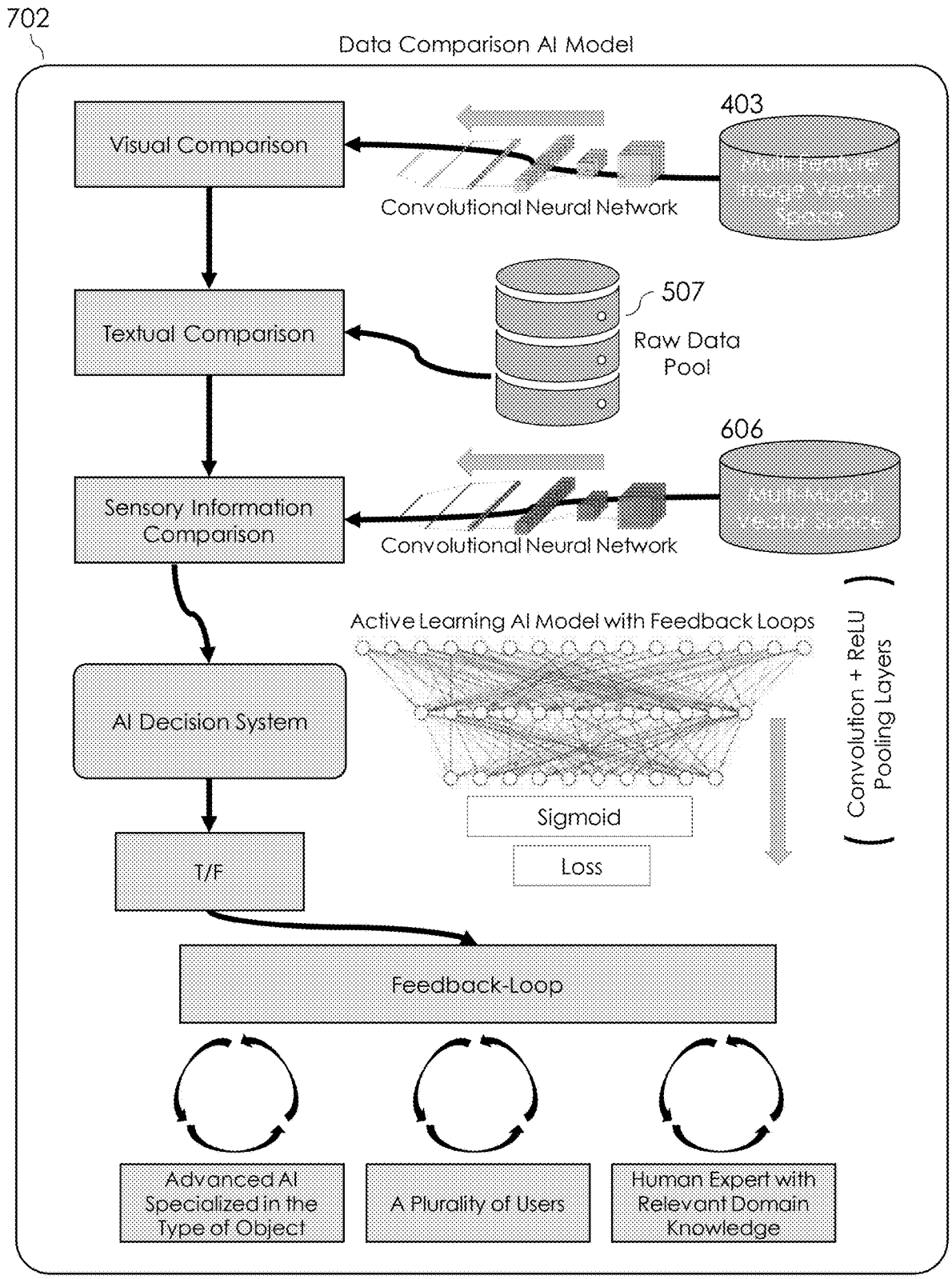
FIG. 15 presents an illustration of the data comparison AI model depicting different storage spaces and the processes of data comparison that receive feedback from different types of supervising entities.

FIG. 15 illustrates an exemplary diagram of the data comparison AI model 702 that include supervisor, training dataset, and the output. The training dataset comprises previously vetted and categorized records, encompassing various types of data such as images, textual information, sensory data, and annotations in previous stages. The output is a list of potential duplicate records, ranked according to the probability of duplication as determined by the model subject to confirmation and/or correction by the supervisor. The supervisor may be a human expert with relevant domain knowledge specific to the object, or a plurality of users as a price for utilizing the service, or an advanced AI system specialized in the type of object capable of providing feedback for algorithmic refinement, or a combination of any of above types of supervisor.

The duplicate search module 701 in FIG. 7 begins by accessing the object information database 800 to find multiple database entries that share similarities with textual representation of the given image. The result of this multiple entries is accompanied by a similarity score through any scoring method. The same process is also used to find similar entries of database based on titles, texts, and alphanumeric codes like UPS, SKUs, and PLUs. It further considers the representation of multi-modal sensory information and annotations. Following this, the data comparison AI model 702 performs a dual analysis: it visually compares the new object with data in multi-feature image vector space 403, and textually with the raw data pool 507, which contains various attributes and other related information derived from object information generator module 500. Additionally, the data comparison AI model can use a multi-modal vector space 606 for identification of duplicate entries. The AI decision system in data comparison AI model 702 can utilize sigmoid or a different type of activation function followed by a loss function suitable for the activation function used.

Through iterative processes and the integration of ranking and correction feedback, the model progressively improves its ability to detect patterns and similarities. This approach, leveraging the capabilities of active learning with feedback loops supervised by an advanced AI specialized in the type of object capable of providing feedback for algorithmic refinement, a plurality of users and/or a human expert with relevant domain knowledge specific to the object, ensures that the data comparison AI model 702 not only identifies obvious duplicates but also uncovers less apparent ones that could be overlooked by more rudimentary systems.

Figure 16:
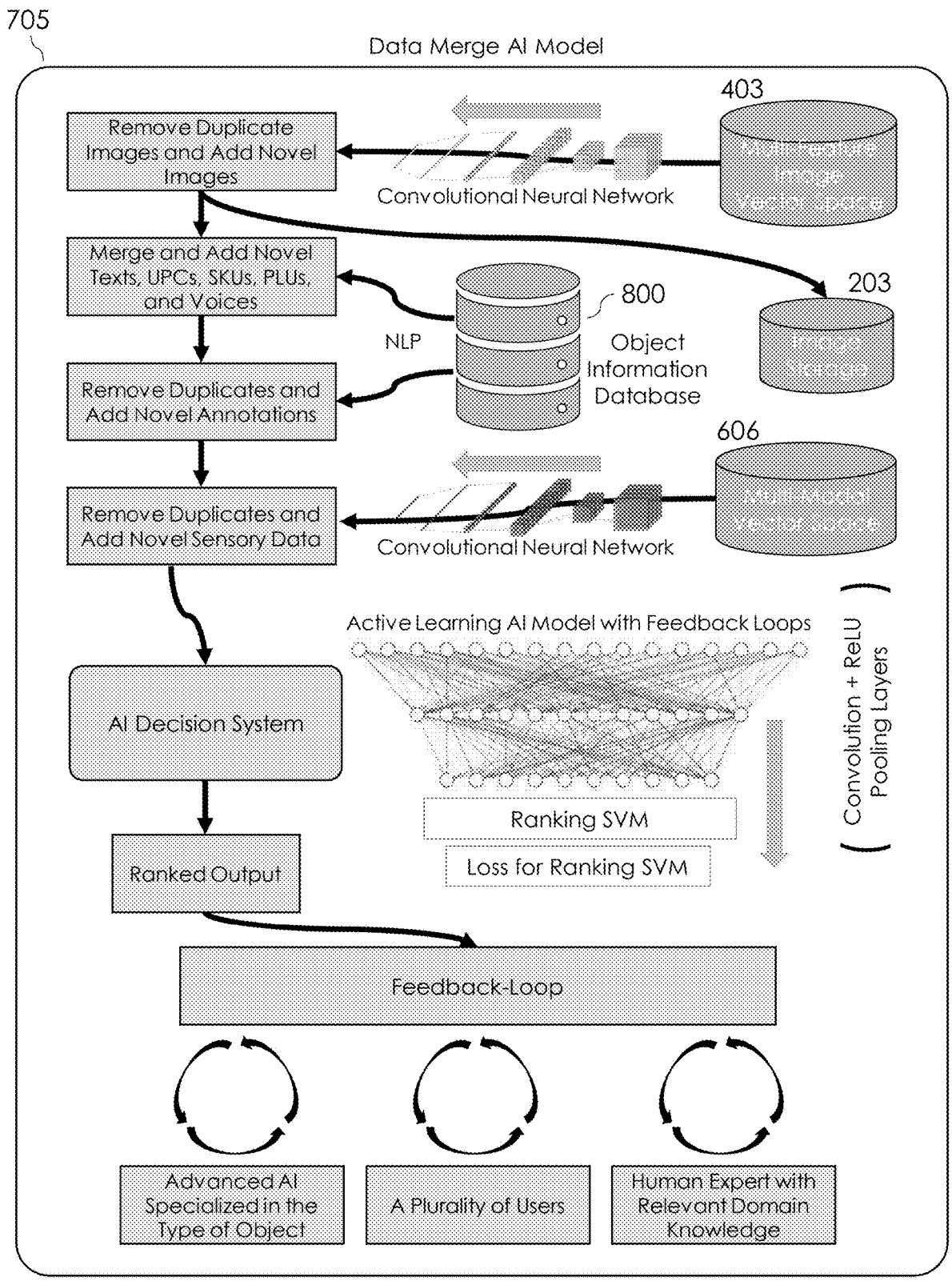
FIG. 16 explains the process of the data merge AI model that leverages various neural networks to produce a ranked output validated by a variety of entities.

Reference is lastly made to FIG. 16, which illustrates exemplary data merge model 705. The data merge AI model 705 is utilized in the merger of existing duplicate records within the object information database 800 and the new information obtained from preceding stages. This model, an embodiment of an active learning algorithm with feedback loops, recognizes duplicate texts or files among the information from the existing records housed in the database and the new information given. The core components of the data comparison AI model 702 include supervisor, training dataset, and ranked output. The training dataset comprises existing records of information and the new set of information. This information includes images, texts, alphanumerical codes, sounds, sensory data, and annotations. The system produces a ranked output of different suggestions of merged set of records, after the elimination of duplicate data and the addition of novel information by the model. The ranked output is subject to confirmation and/or correction by the supervisor. The supervisor may be a human expert with relevant domain knowledge specific to the object, a plurality of users as a price for utilizing the service, and/or an advanced AI system specialized in the type of object capable of providing feedback for algorithmic refinement, or a combination of any of above types of supervisor.

The data merge module 704 in FIG. 7 starts by comparing the new set of images with images stored in multi-feature image vector space 403. If there are novel images for the object, the data merge module 704 records the file path or the location on disk of novel images in memory to be eventually stored in the object information database 800 along with other types of data. The data merge module 704 then deletes duplicate images and records. The data merge module 704 also compare the new set of files for multi-modal information by searching through features stored in multi-modal vector space 606. If there are novel data files for the object, the data merge module 704 records the file path or the location on disk of novel data in memory to be eventually stored in the object information database 800 along with other types of data. The data merge module 704 then deletes duplicate files in the sensory data storage and duplicate records in the object information database 800.

Subsequently the data merge module 704 compares the existing one or more database entries with the newly acquired data and produces several best versions of merged data. The same process is also used to merge entries of database based on titles, texts, and alphanumeric codes such as UPS, SKUs, and PLUs. It further merges the textual representation of multi-modal sensory information and annotations. Following this, the data merge AI model 705 outputs several versions of merged data for each criterion. This will be ranked by the supervisor in the order of accuracy and validity. The data merge AI model 705 can utilize ranking SVM followed by a loss function for ranking SVM.

The new set of data prior to the merge operation gets recorded in an archive after adding a reference code to the object's entry. The existing database entries get transferred to an archive after adding a reference code to the object's entry also. This archival process serves a dual purpose of preserving the original state of the data for historical reference and also facilitating future revisions or other analytical operations. The data merge module 704 then deletes duplicate files for multi-modal data. Finally, the set of top ranked merged data for each criterion is inserted in the object information database 800.

The implementation of these novel duplication detection and merging mechanisms ensures that search results are not only relevant and precise but also effectively consolidate scattered information in a comprehensive manner, enhancing the overall data integrity and operational efficiency.

What is claimed is:

1. A computer-implemented system for classifying and identifying objects, comprising:
    a server space configured to process and analyze multi-feature and multi-modal data, including image optimization, feature extraction, pattern recognition, character recognition, annotation, and finding duplicate objects, and merging novel data to existing unique object entity, said server space further comprising:
        a multi-feature extraction module for generating attentions-based fused embeddings which serves as a searchable index;
        a multi-modal integrator for processing data from different modalities through attention-based fused embeddings that serves as a searchable index;
    a querying device capable of receiving input in various forms through uploading an image, typing texts, recording voices, and sending data from various visual, textual, auditory, olfactory, and tactile sensors, and utilizing various methods of input that can provide size, mass, and density data; and
    a data interface module for conducting searches based on multi-modal data inputs and iteratively refining these searches based on an additional data and context and corrections provided by the querying device; and
    a data farm for storing and processing a multitude of data types, including visual, textual, auditory, olfactory, and tactile information, and user data, and object inventory data comprising;
        a database table to store a unique identifier, UPC, SKUs, PLUs, primary titles, alternative titles, primary descriptions, alternative descriptions, category, alternative categories, sub-categories, the locations on disk and/or the file names of associated image files, odor/taste files, tactility files, sound files, and related data as well as database fields for labels corresponding to images, odor, taste, tactility, sound profiles; and further a database table to store lexicons of synonyms, regional dialects, variations in vocal expressions associated with individual terms or tokens, misspelled or misused expressions, odor descriptors, taste descriptors, tactility descriptors, variations in auditory attributes to search not only for the exact keyword but also for synonyms, misspelled variants, misused terminology, regional dialectic disparities, and variations associated with each modality.

2. The computer-implemented system of claim 1, wherein the querying device further comprising the components for collecting various data performed by a processor that comprises:

an isolating process and an image optimization process is performed by weights and vectors that were transmitted from the data farm; and further interfacing with the data interface module to iterate inputting more data and correcting previous inputs.

3. The computer-implemented system of claim 2, wherein the querying device that collects various data and interfacing with the data farm and the data interface module is smartphones, tablets, computers, smart glasses, scopes, smart hats, smart wearable devices, cameras, servers, cloud computing spaces, edge computing devices, electronics, vehicles, satellites, houses, buildings, factories, warehouses, construction sites, farms, hospitals, airports, educational facilities, military equipment, signs and poles on streets, roads, tracks, waterways, containers, fixtures, gaming tools, robotics for industrial automation, service robots, drones, and research and development equipment.

4. A non-transitory computer-readable storage medium having stored therein instructions executable by a computing device to cause the computing device to execute functions comprising:

processing and analyzing multi-feature and multi-modal data, including image optimization, feature extraction, pattern recognition, character recognition, annotation, and finding duplicate objects, and merging novel data to an existing unique object entity; and receiving an input in various forms through uploading an image, typing texts, recording voices, and sending data from various visual, textual, auditory, olfactory, and tactile sensors, and utilizing various methods of input that can provide a size, mass, and density data; and conducting searches based on multi-modal data inputs and iteratively refining these searches based on an additional data and context and corrections provided by the querying device; and storing and processing a multitude of data types, including visual, textual, auditory, olfactory, and tactile information, and user data, and object inventory data.

* * * * *